United States Patent
Hong et al.

(10) Patent No.: US 10,187,514 B2
(45) Date of Patent: Jan. 22, 2019

(54) MOBILE TERMINAL AND METHOD FOR CONTROLLING THE SAME

(71) Applicant: LG Electronics Inc., Seoul (KR)

(72) Inventors: Jipyo Hong, Seoul (KR); Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 522 days.

(21) Appl. No.: 14/925,450

(22) Filed: Oct. 28, 2015

(65) Prior Publication Data

US 2017/0041455 A1 Feb. 9, 2017

(30) Foreign Application Priority Data

Aug. 6, 2015 (KR) .......................... 10-2015-0110985

(51) Int. Cl.
*G06F 3/048* (2013.01)
*H04M 1/725* (2006.01)
(Continued)

(52) U.S. Cl.
CPC ...... *H04M 1/72586* (2013.01); *G06F 3/0414* (2013.01); *G06F 3/0482* (2013.01);
(Continued)

(58) Field of Classification Search
CPC .......... H04M 1/72586; H04M 2250/22; G06F 3/0414; G06F 3/04817; G06F 3/04842;
(Continued)

(56) References Cited

U.S. PATENT DOCUMENTS 5,821,933 A * 10/1998 Keller ................. G06F 3/04817
707/999.009
6,745,334 B1 * 6/2004 Ikegami ............. H04N 1/32122
358/1.6
(Continued)

FOREIGN PATENT DOCUMENTS

JP 2013-92989 A 5/2013

*Primary Examiner* — Andrew T Chiusano
(74) *Attorney, Agent, or Firm* — Birch, Stewart, Kolasch & Birch, LLP

(57) ABSTRACT

A mobile terminal including a wireless communication unit configured to provide wireless communication; a touchscreen; and a controller configured to display a home screen on the touchscreen including a plurality of application icons corresponding to applications executable on the mobile terminal, receive a first touch input on the home screen, display a first screen on the touchscreen including a rearrangement of the application icons in which the application icons having a first frequency of use are displayed in a first area of the first screen and the application icon having a second frequency of use are displayed in a second area of the first screen, in response to the first touch input, receive a second touch input on the first screen, and display a second screen on the touchscreen including a rearrangement of the application icons in which the application icons having a third frequency of use are displayed in a first area of the second screen and the application icon having a fourth frequency of use are displayed in a second area of the second screen, in response to the second touch input.

18 Claims, 24 Drawing Sheets

(51) Int. Cl.
*G06F 9/451* (2018.01)
*G06F 3/0488* (2013.01)
*G06F 9/44* (2018.01)
*G06F 3/0481* (2013.01)
*G06F 3/041* (2006.01)
*G06F 3/0482* (2013.01)
*G06F 3/0484* (2013.01)
*H04W 88/02* (2009.01)

(52) U.S. Cl.
CPC ........ *G06F 3/0488* (2013.01); *G06F 3/04817* (2013.01); *G06F 3/04842* (2013.01); *G06F 3/04883* (2013.01); *G06F 9/4443* (2013.01); *G06F 9/451* (2018.02); *G06F 2203/04803* (2013.01); *H04M 2250/22* (2013.01); *H04W 88/02* (2013.01)

(58) Field of Classification Search
CPC .. G06F 3/0488; G06F 3/04883; G06F 9/4443; G06F 2203/04803; H04W 88/02
See application file for complete search history.

(56) References Cited

U.S. PATENT DOCUMENTS

| | | |
|---|---|---|
| 8,359,541 B1 | 1/2013 | Landry |
| 2002/0075319 A1* | 6/2002 | Hochmuth .......... G06F 3/04817 715/810 |
| 2010/0026640 A1* | 2/2010 | Kim ...................... G06F 3/0414 345/173 |
| 2011/0179368 A1* | 7/2011 | King .................. G06F 3/04815 715/769 |
| 2012/0309433 A1 | 12/2012 | Jeong et al. |
| 2013/0125056 A1* | 5/2013 | Suda ..................... G06F 3/0488 715/846 |
| 2013/0181941 A1* | 7/2013 | Okuno .................... G06F 3/041 345/174 |
| 2014/0201681 A1* | 7/2014 | Mahaffey .......... H04M 1/72569 715/846 |
| 2015/0199110 A1* | 7/2015 | Nakazato ............... G06F 3/0487 715/763 |
| 2015/0378593 A1* | 12/2015 | Zhang ................... G06F 3/0481 715/768 |
| 2016/0070437 A1* | 3/2016 | Chiang ............ H04M 1/72586 715/846 |
| 2016/0291843 A1* | 10/2016 | Sheng ................... G06F 3/0481 |

* cited by examiner (a)     (b)

(a)  (b)

(a)             (b)

MOBILE TERMINAL AND METHOD FOR CONTROLLING THE SAME

CROSS-REFERENCE TO RELATED APPLICATIONS

This application claims priority to Korean Patent Application No. 10-2015-0110985 filed on Aug. 6, 2015 in Korea, the entire contents of which is hereby incorporated by reference in its entirety.

BACKGROUND OF THE INVENTION

Field of the Invention

The present invention relates to a mobile terminal and a method for controlling the same.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Meanwhile, according to the related art, to remove some of the plurality of icons on a home screen corresponding to applications which are not used frequently, there is inconvenience that these icons have to be deleted directly by a user.

Also, according to the related art, if icons corresponding to applications which are used frequently are not added to the home screen, there is inconvenience that the user has to directly add the corresponding icons to the home screen. That is, a problem occurs in that icons which will be displayed on the home screen and icons which will not be displayed on the home screen cannot be extracted automatically in accordance with frequency of use of applications.

Further, according to the related art, problems occur in that an empty space may be generated by icons deleted during a process of cleaning up the home screen and a specific portion (for example, face) of an image displayed on a background is covered during the process of cleaning up the home screen. Also, according to the related art, if an icon of an application which is used frequently to the home screen, a problem occurs in that the icon is exposed to another user if another user uses a mobile terminal. That is, a problem occurs in that other people may view an icon of a specific application which is used frequently as a user displays the icon of the specific application on the home screen.

SUMMARY OF THE INVENTION

Accordingly, the present invention is directed to a mobile terminal and a method for controlling the same, which substantially obviates one or more problems due to limitations and disadvantages of the related art.

An object of the present invention is to provide a mobile terminal and a method for controlling the same, in which a controller of the mobile terminal extracts at least one first icon corresponding to an application, which will be displayed on a home screen, by using information on frequency of use of each of a plurality of applications stored in a memory, and the extracted at least one first icon is only displayed on the home screen.

Another object of the present invention is to provide a mobile terminal and a method for controlling the same, in which a controller of the mobile terminal displays at least one second icon corresponding to an application, of which frequency of use is low, on a home screen by using information on frequency of use of each of a plurality of applications stored in a memory after touching one point within the home screen and dragging the touched point in a specific direction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention comprises a memory configured to store a plurality of applications and first information on frequency of use of each of the plurality of applications; and a controller configured to control a display unit to display a first screen, which includes a plurality of icons corresponding to the plurality of applications stored in the memory, in accordance with a first touch input and determining a position where each of the plurality of icons is displayed within the first screen, based on the first information, wherein the controller controls the display unit to display a second screen where the position where each of the plurality of icons is displayed is varied within the first screen based on the first information as the first touch input is sensed again when the first screen is displayed.

In another aspect of the present invention, a method for controlling a mobile terminal according to one embodiment of the present invention comprises the steps of storing first information on frequency of use of each of a plurality of applications in a memory; displaying a first screen, which includes a plurality of icons corresponding to the plurality of applications stored in the memory, in accordance with a first touch input and determining a position where each of the plurality of icons is displayed within the first screen, based on the first information; and displaying a second screen where the position where each of the plurality of icons is displayed is varied within the first screen based on the first information as the first touch input is sensed again when the first screen is displayed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
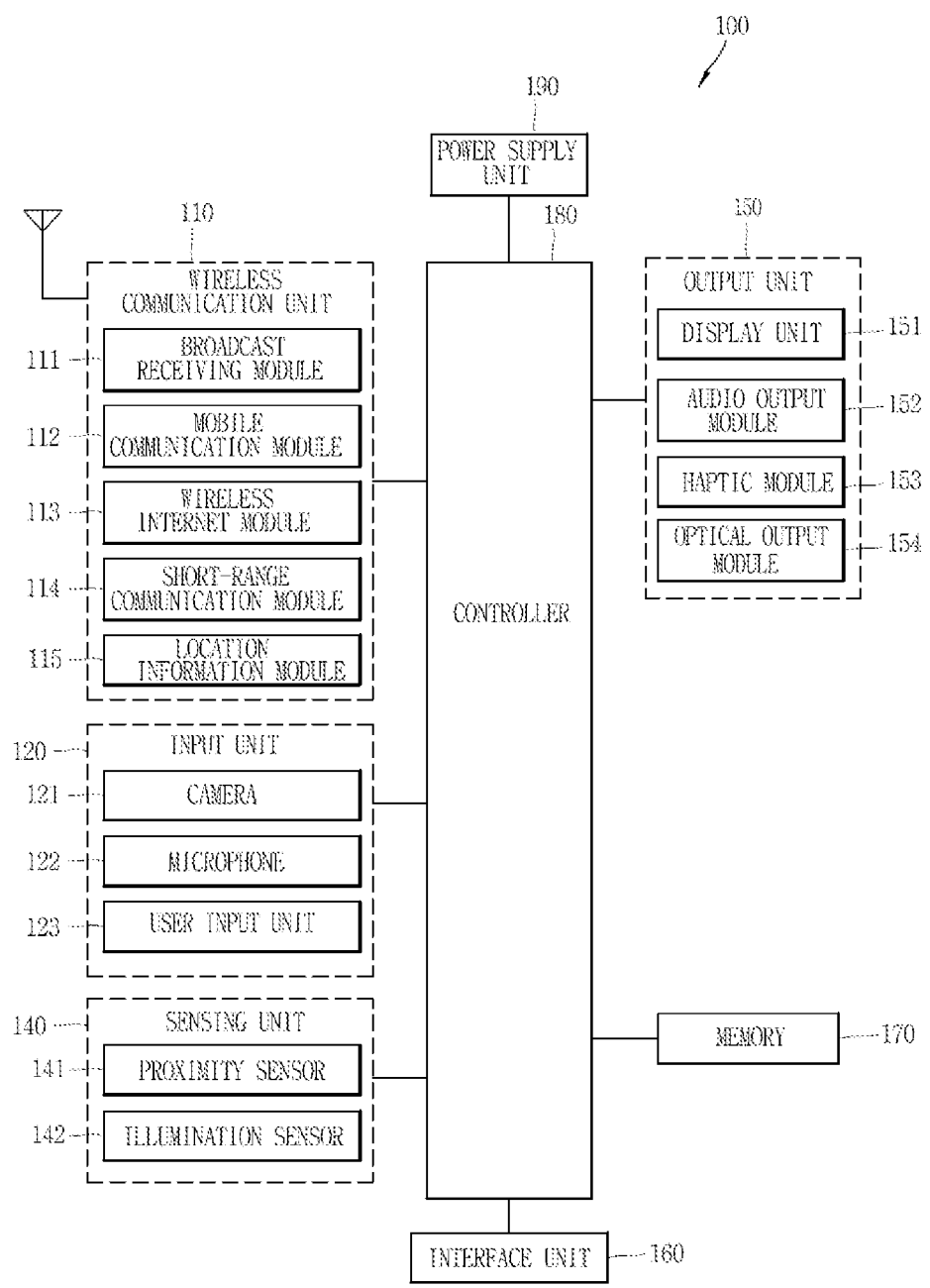
FIG. 1A is a block diagram of a mobile terminal in accordance with the present disclosure.
Figure 1B:
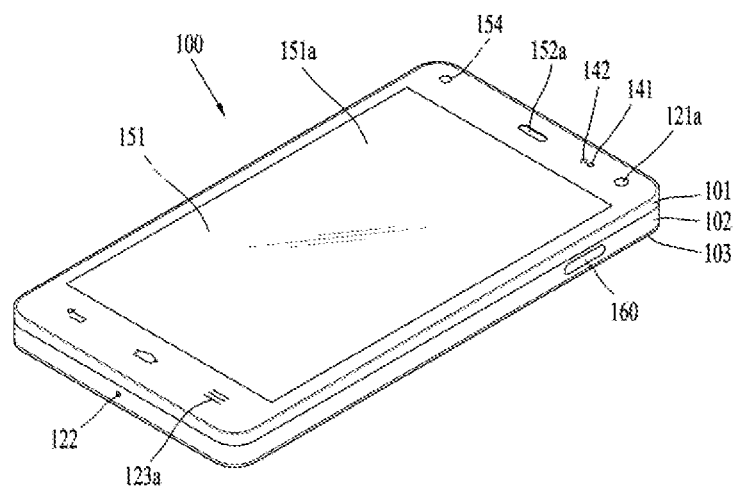
FIGS. 1B and 1C are conceptual views of one example of the mobile terminal, viewed from different directions.
Figure 1C:
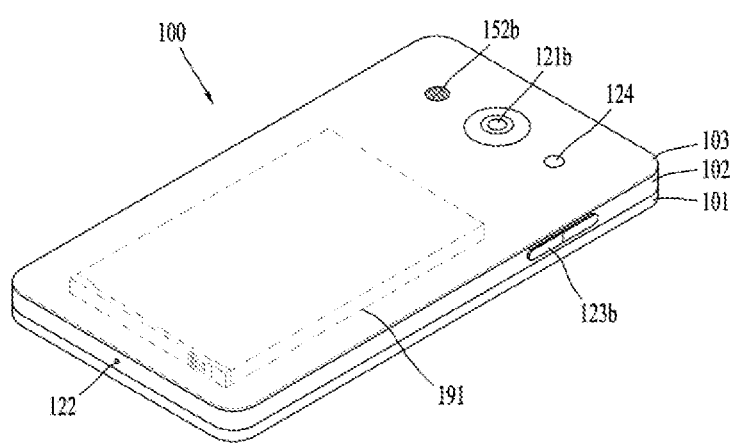

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by the controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112. The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch. A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller.

The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100. An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example. The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface. If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output. The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102. An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
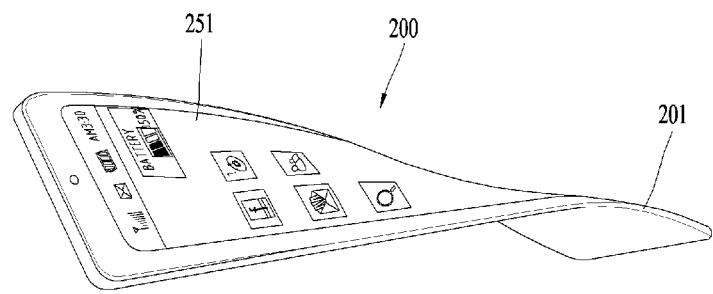
FIG. 2 is a conceptual view of a deformable mobile terminal according to an alternative embodiment of the present disclosure.

Meanwhile, according to an embodiment of the present invention, the controller 180 can display information processed by the mobile terminal using a flexible display. This is described in detail with reference to the accompanying drawings as follows. In particular, FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells. The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
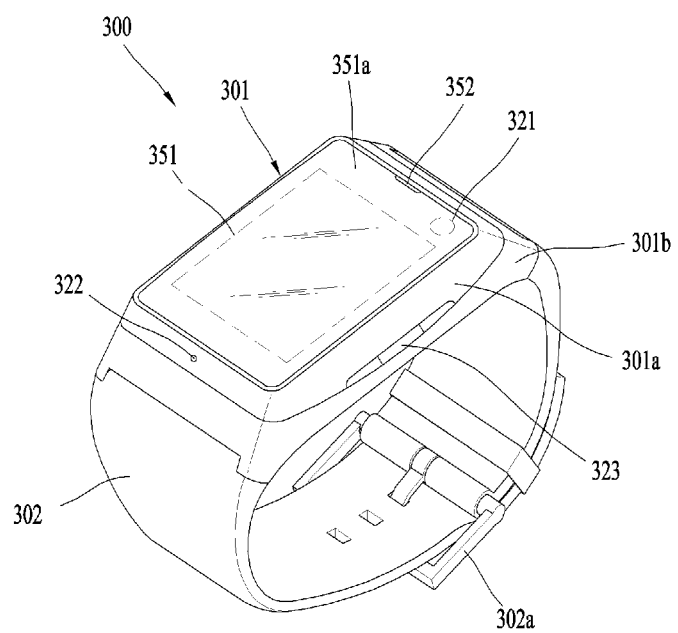
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 4:
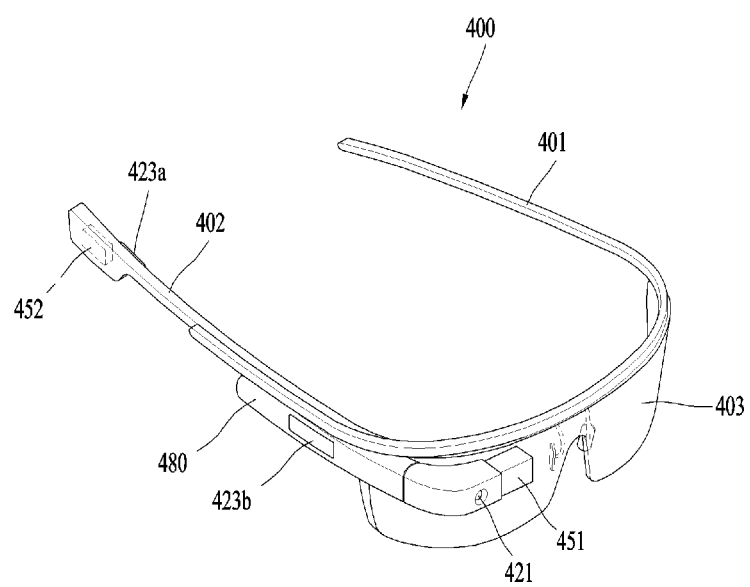
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefore. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned. As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof. Hereinafter, the embodiments of the present invention will be described with reference to the mobile terminal 100 shown in FIG. 1A. However, the mobile terminals 200, 300 and 400 shown in FIGS. 2 to 4 may be used as the mobile terminal according to one embodiment of the present invention.

Hereinafter, a method for cleaning up an icon corresponding to each of a plurality of applications displayed on a home screen in accordance with frequency of use of each of the plurality of applications and displaying the icon corresponding to each of the plurality of applications in the mobile terminal 100 according to one embodiment of the present invention will be described with reference to FIGS. 5 to 24.

Figure 5:
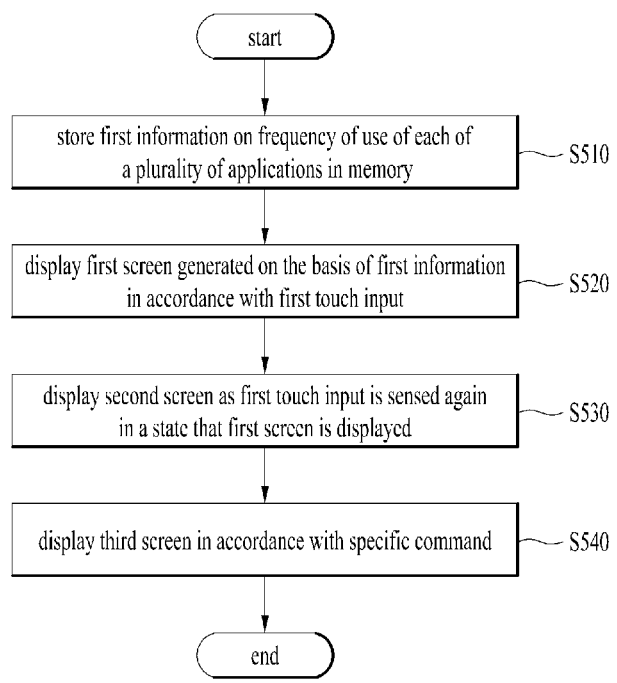
FIG. 5 is a flow chart illustrating a method for determining an icon which will be displayed on a home screen in a mobile terminal according to one embodiment of the present invention.

In particular, FIG. 5 is a flow chart illustrating a method for determining an icon which will be displayed on a home screen in a mobile terminal according to one embodiment of the present invention. For convenience of description in the present invention, it is assumed that a plurality of applications are stored in the memory 170.

The controller 180 can store first information on frequency of use of each of the plurality of applications in the memory (S510). In more detail, the controller 180 can recognize the number of times of each of the plurality of applications stored in the memory 170, which is used for a predetermined time (for example, one month or two months). In addition, the controller 180 can store the recognized number of times of each of the plurality of applications, which is used for the predetermined time, in the memory 170 as first information.

The controller 180 can control the display unit 151 to display a first screen generated based on the first information, in accordance with a first touch input (S520). In more detail, in step S520, the controller 180 can control the display unit 151 to display a first screen, which includes a plurality of icons corresponding to a plurality of applications stored in the memory 170, in accordance with the first touch input, and determine a position where each of the plurality of icons is displayed within the first screen based on the first information.

In step S520, the first touch input may be a touch input of which strength of a pressure applied to the display unit 151 corresponds to a predetermined strength. In more detail, the touch sensor included in the sensing unit 140 can sense strength of a pressure applied to a specific one point (for example, a point where no icon is displayed) within a predetermined screen (for example, home screen) output to the display unit 151. If the sensing unit 140 senses the touch input that touches the specific one point at strength of a pressure corresponding to the predetermined strength of the pressure for a predetermined time, the controller 180 can control the display unit 151 to display the first screen. For example, when a specific target (for example, finger, touch pen, or stylus pen, pointer, etc.) applies a strong pressure to the specific one point, the controller 180 can recognize the first touch input as the touch input corresponding to the predetermined strength if a touch input of which strength of the pressure exceeds a predetermined level is sensed through the sensing unit 140 for the predetermined time, and control the display unit 151 to display the first screen. However, in accordance with the embodiment, the first touch input may be the touch input that touches one point within the predetermined screen for the predetermined time regardless of the strength of the pressure.

In step S520, the first screen may be a screen where at least one icon which will be displayed on a third screen (for example, home screen) and at least one icon which will not be displayed on the third screen are sorted. In more detail, at least one first icon corresponding to at least one application which will be displayed on the third screen may be displayed on a first area within the first screen, and at least one second icon corresponding to at least one application which will not be displayed on the third screen may be displayed on a second area within the first screen. That is, the first screen may include the first area, which displays at least one first icon corresponding to at least one application (for example, at least one application which is used more than five times for two months) of which frequency of use exceeds a first level among the plurality of applications, and the second area, which displays at least one second icon corresponding to at least one application (for example, at least one application which is used five times or less for two months) of which frequency of use is a first level or less among the plurality of applications. This will be described later in more detail with reference to FIGS. 6 to 8.

The controller 180 can control the display unit 151 to display the second screen as the first touch input is sensed again when the first screen is displayed (S530). In more detail, the controller 180 can control the display unit 151 to display the second screen if the first touch input that touches a specific point (for example, point where no icon is displayed) within the first screen at a predetermined pressure for a predetermined time is sensed after the first screen is displayed in step S520.

In step S530, the second screen may be a screen where at least one icon which will be displayed on the third screen (for example, home screen) and at least one icon which will not be displayed on the third screen are sorted. In this instance, the second screen is the screen where the position where each of the plurality of icons is displayed is varied within the first screen based on the first information, and is different from the first screen in the step S520.

In more detail, the second screen may include a third area, which displays at least one third icon corresponding to at least one application (for example, at least one application which is used to exceed five times for one month) exceeding a second level of frequency of use among the plurality of applications, and a fourth area, which displays at least one fourth icon corresponding to at least one application (for example, at least one application which is used five times or less for one month) of which frequency of use is a second level or less among the plurality of applications. This will be described later in more detail with reference to FIGS. 7 and 8.

The controller 180 can control the display unit 151 to display the third screen (for example, home screen) in accordance with a specific command (S540). For example, the specific command may be a command to display at least one first icon, which is displayed on the first area within the first screen, on the third screen, or may be a command to display at least third icon, which is displayed on the third area within the second screen, on the third screen. This will be described later in more detail with reference to FIGS. 6 to 8.

In step S540, if the specific command is the first command to display at least one first icon, which is displayed on the first area within the first screen, on the third screen, the third screen (for example, home screen) may be the screen that includes at least one first icon displayed on the first area within the first screen. Also, in step S540, if the specific command is the second command to display at least one first icon, which is displayed on the third area within the second screen, on the third screen, the third screen may be the screen that includes at least one first icon displayed on the third area within the second screen. That is, the controller 180 can control the display unit 151 to display the third screen, which includes at least one first icon displayed on the first area within the first screen or at least one third icon displayed on the third area within the second screen if the specific command is sensed when the first screen is displayed. As a result, the user can determine an icon which will be displayed on the third screen (for example, home screen) by using the first screen and the second screen.

Meanwhile, in accordance with the embodiment, if the strength of the pressure applied to the display unit 151 is a touch input corresponding to a predetermined strength and the touch input is maintained for the predetermined time, the controller 180 can determine an icon which will be displayed on the second screen to correspond to the time when the touch input is sensed. This will be described later in more detail with reference to FIG. 10.

According to the related art, there is inconvenience that the user should manually delete icons except icons which are used frequently to clean up icons displayed on a home screen in accordance with frequency of use. However, according to this embodiment, the controller 180 can automatically sort at least one icon corresponding to an application which is used frequently and at least one icon corresponding to an application which is not used frequently, on the first screen in accordance with the first touch input, and also sort at least one icon corresponding to an application which is used more frequently and at least one icon corresponding to an application which is not used more frequently, on the second screen if the first touch input is input again when the first screen is displayed, whereby the user can easily clean up the icon, which will be displayed on the home screen, by using the first screen or the second screen, and thus convenience may be provided to the user.

Figure 6:
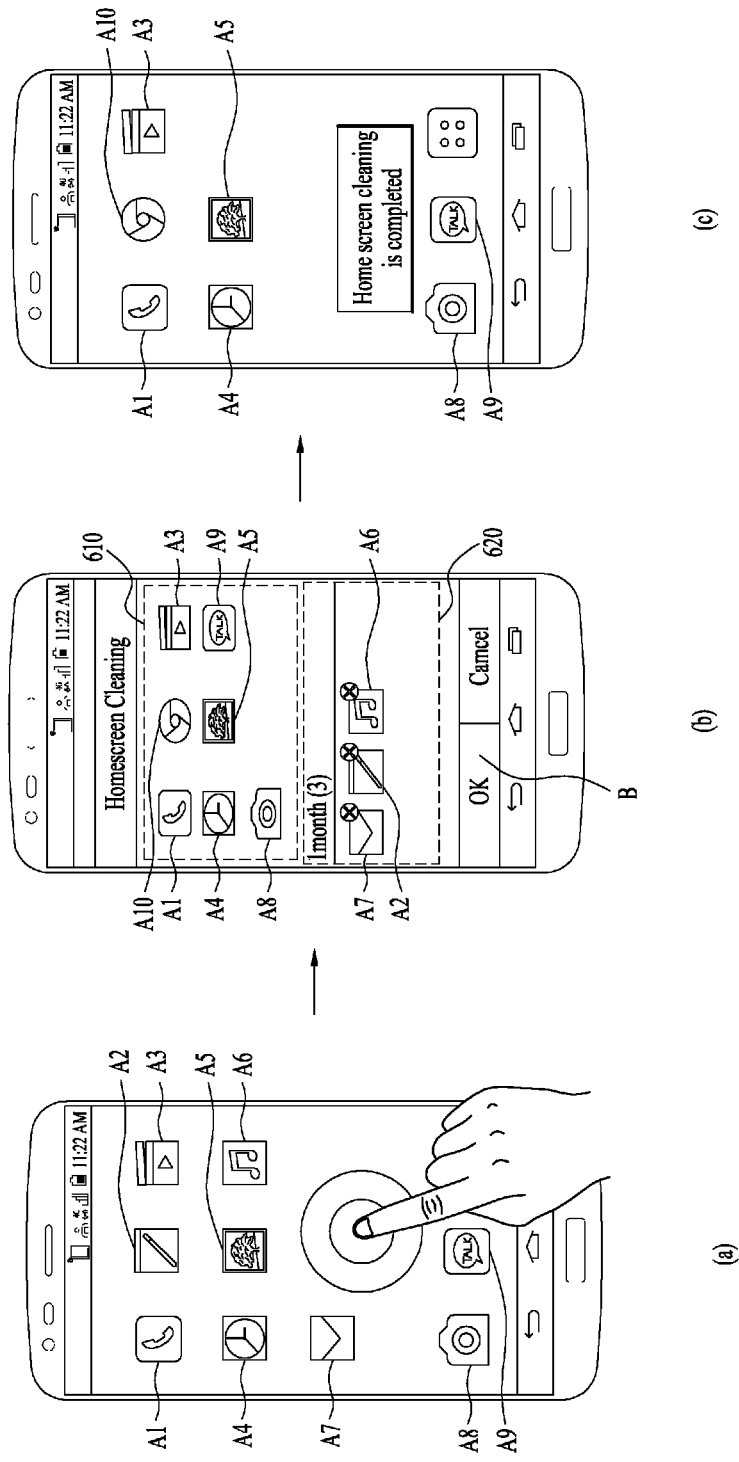
FIG. 6 is a view illustrating an example of a method for determining an icon which will be displayed on a home screen in a mobile terminal according to one embodiment of the present invention.

FIG. 6 is a view illustrating an example of a method for determining an icon which will be displayed on a home screen in a mobile terminal according to one embodiment of the present invention. For convenience of description in the present invention, it is assumed that a plurality of applications are stored in the memory 170.

Referring to (a) of FIG. 6, the controller 180 can control the display unit 151 to display icons, which correspond to at least one application selected by the user among the plurality of applications stored in the memory 170, on the home screen. In more detail, the user can arrange first to ninth icons A1 to A9 of the plurality of applications stored in the memory 170, on the predetermined screen (for example, home screen). That is, the icons corresponding to the applications selected by the user not the icons corresponding to all the applications stored in the memory 170 may be displayed on the home screen.

The controller 180 can display the first screen in accordance with a first touch input when the predetermined screen (for example, home screen) is displayed. For example, the first touch input may be a touch input of which strength of a pressure applied to the display unit 151 corresponds to a predetermined strength. In accordance with the embodiment, the first touch input may be a touch input of which strength of a pressure applied to the display unit 151 for a predetermined time corresponds to the predetermined strength.

Referring to (b) of FIG. 6, the controller 180 can determine a position where each of the plurality of icons is located, based on first information (for example, information on a level of each of the plurality of applications used for a predetermined time) on frequency of use of each of the plurality of applications when displaying the first screen. In this instance, the first screen is a screen different from the home screen, and may be a screen that selects at least one icon which will be displayed on the home screen.

In more detail, the controller 180 can control the display unit 151 to display at least one first icon corresponding to at least one application, of which frequency of use exceeds a predetermined level, among the plurality of applications stored in the memory 170, on a first area 610. Also, the controller 180 can control the display unit 151 to display at least one second icon corresponding to at least one application, of which frequency of use is a predetermined level or less, among the plurality of applications stored in the memory 170, on a second area 620.

For example, the controller 180 can control the display unit 151 to display first icons A1, A3, A4, A5, A8, A9 and A10 corresponding to applications of which frequency of use exceeds five times for one month, among the plurality of applications stored in the memory 170, on a first area 610 within the first screen. Also, the controller 180 can control the display unit 151 to display second icons A2, A6 and A7 corresponding to applications of which frequency of use is five times or less for one month, among the plurality of applications stored in the memory 170, on the second area 620 within the first screen. Therefore, the user can intuitively identify an icon corresponding to an application of which frequency of use is high, among the icons displayed on the first screen, through the position where the corresponding icon is displayed on the first screen.

In accordance with the embodiment, the user can change the predetermined level. For example, the controller 180 can display at least one first icon corresponding to at least one application which is used to exceed five times for one month, on the first area 610 within the first screen in accordance with the first touch input, and display at least one second icon corresponding to at least one application which is used five times or less for one month, on the second area 620 within the first screen. If the user scrolls one point within the second area 620 after touching the point, at least one first icon corresponding to at least one application which is used to exceed five times for two months may be displayed on the first area 610, and at least one second icon corresponding to at least one application which is used five times or less for two months may be displayed on the second area 620.

In accordance with the embodiment, if it is difficult for all the icons to be displayed on at least one of the first area 610 and the second area 620 due to the large number of the plurality of icons corresponding to the plurality of applications, the controller 180 can control the display unit 151 to display some of the plurality of icons on the first area 610 or the second area 620 and display icons, which has been failed to be displayed on the first area 610 or the second area 620, on a screen switched by scrolling the first area 610 or the second area 620 up/down or left/right direction.

Meanwhile, in accordance with the embodiment, the user can move the first icon displayed on the first area 610 to the second area 620, and move the second icon displayed on the second area 620 to the first area 610. This will be described later in more detail with reference to FIGS. 7 and 8. Meanwhile, referring to (c) of FIG. 6, the controller 180 can control the display unit 151 to display a second screen (for example, home screen), which includes the at least one first icon, in accordance with a specific command. For example, the specific command may be a command that selects a specific indicator B displayed on the first screen. That is, if the user selects the specific indicator B, as shown in (b) of FIG. 6, the controller 180 can control the display unit 151 to display a second screen (for example, home screen), which includes the at least one first icons A1, A3, A4, A5, A8, A9 and A10 displayed on the first area among the icons displayed on the first screen. As a result, the user can display only at least one first icon corresponding to the application, of which frequency of use exceeds a predetermined level, on the home screen by using the first screen.

In this embodiment, when the number of icons included in a predetermined screen (for example, home screen) before the first touch input is sensed is reduced as compared with the number of icons included in the second screen (for example, home screen where displayed icons are changed) of (c) of FIG. 6 has been described. However, the number of icons included in a predetermined screen before the first touch input is sensed may be more than the number of icons included in the second screen of (c) of FIG. 6 in accordance with the embodiment. In more detail, if the number of icons corresponding to an application of which frequency of use exceeds the predetermined level among the icons corresponding to the plurality of applications stored in the memory 170 is more than the number of icons included in the predetermined screen, the number of icons included in the second screen of (c) of FIG. 6 may be more than the number of icons included in the predetermined screen.

Figure 7:
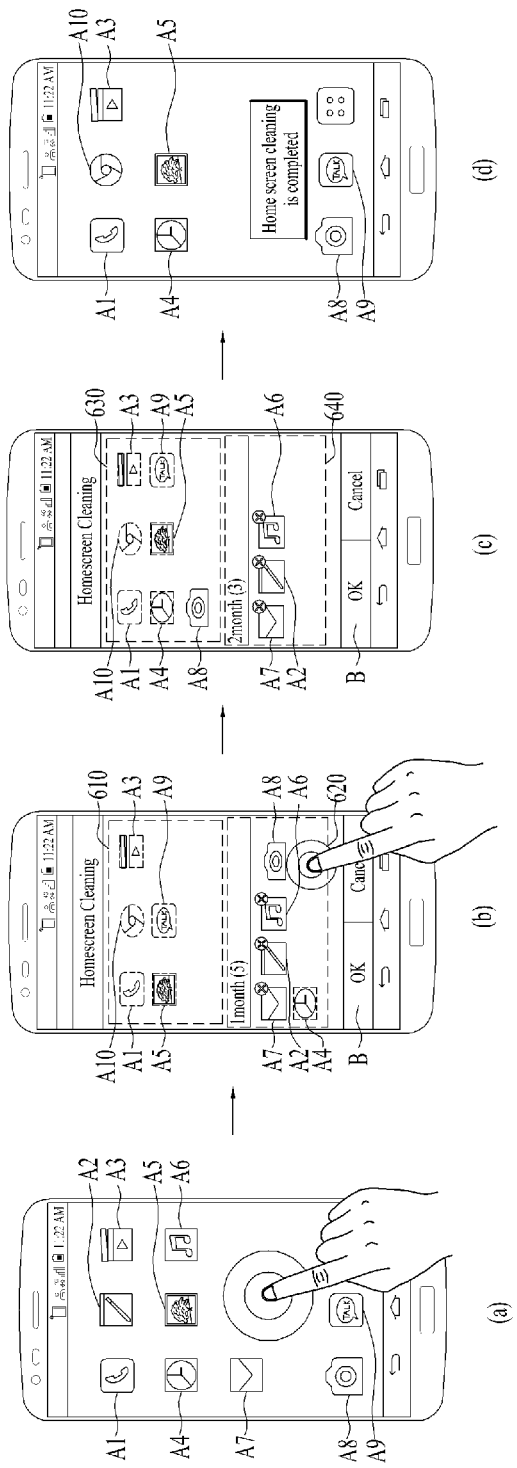
FIG. 7 is a view illustrating another example of a method for determining an icon which will be displayed on a home screen in a mobile terminal according to one embodiment of the present invention.

Next, FIG. 7 is a view illustrating another example of a method for determining an icon which will be displayed on a home screen in a mobile terminal according to one embodiment of the present invention. In FIG. 7, repeated description for the description made with reference to FIG. 6 will be omitted, and the embodiment of FIG. 7 will be described based on a difference with the embodiment of FIG. 6.

Referring to (a) of FIG. 7, the controller 180 can control the display unit 151 to display an icon corresponding to at least one application selected by the user, among the plurality of applications stored in the memory 170, on the home screen. Since this description is the same as the description made with reference to (a) of FIG. 6, its detailed description will be omitted.

The controller 180 can display the first screen in accordance with the first touch input when the predetermined screen (for example, home screen) is displayed. For example, the first touch input may be a touch input of which strength of a pressure applied to the display unit 151 corresponds to a predetermined strength. In accordance with the embodiment, the first touch input may be a touch input of which strength of the pressure applied to the display unit 151 for a predetermined time corresponds to the predetermined strength.

The controller 180 can control the display unit 151 to display at least one first icon corresponding to at least one application, of which frequency of use exceeds a first level based on first information (for example, information on a level of each of the plurality of applications used for a predetermined time) on frequency of use of each of the plurality of applications, on the first area 610 within the first screen when displaying the first screen. Also, the controller 180 can control the display unit 151 to display at least one second icon corresponding to at least one application, of which frequency of use is the first level or less based on the first information on frequency of use among the plurality of applications stored in the memory 170, on the second area 620 within the first screen.

For example, referring to (b) of FIG. 7, the controller 180 can control the display unit 151 to display at least one first icons A1, A3, A5, A9 and A10 corresponding to applications of which frequency of use exceeds five times for one month, among the plurality of applications, on the first area 610 within the first screen when displaying the first screen. Also, the controller 180 can control the display unit 151 to display at least one second icons A2, A4, A6, A7 and A8 corresponding to applications of which frequency of use is five times or less for one month, among the plurality of applications stored in the memory 170, on the second area 620 within the first screen.

If the first touch input is sensed again when the first screen is displayed, the controller 180 can control the display unit 151 to display a second screen where a position where each of the plurality of icons is displayed is varied within the first screen based on the first information. In more detail, the controller 180 can control the display unit 151 to display at least one third icon corresponding to at least one application, of which frequency of use exceeds a second level based on the first information (for example, information on a level of each of the plurality of applications used for a predetermined time) on frequency of use of each of the plurality of applications, on the third area 630 within the second screen when displaying the second screen. Also, the controller 180 can control the display unit 151 to display at least one fourth icon corresponding to at least one application, of which frequency of use is the second level or less based on the first information on frequency of use among the plurality of applications stored in the memory 170, on the fourth area 640 within the second screen.

For example, referring to (c) of FIG. 7, if the first touch input of which strength of the pressure applied to the display unit 151 for the predetermined time corresponds to the predetermined strength is sensed again when the first screen is displayed, the controller 180 can control the display unit 151 to display at least one third icons A1, A3, A4, A5, A8, A9 and A10 corresponding to at least one application of which frequency of use exceeds five times for two months among the plurality of applications stored in the memory 170, on the third area 630. Also, the controller 180 can control the display unit 151 to display at least one fourth icons A2, A6 and A7 corresponding to at least one application of which frequency of use is five times or less for two months among the plurality of applications stored in the memory 170, on the fourth area 640.

As a result, the controller 180 can determine the icons, which will be displayed on the third screen (for example, home screen), in accordance with frequency of use of the applications used as much as predetermined number of times for the predetermined time if the first touch input is sensed once, and may determine the icons, which will be displayed on the third screen, in accordance with frequency of use of the applications used as much as predetermined number of times for a time period increased to correspond to the sensed touch input if the first touch input is sensed several times.

Meanwhile, referring to (d) of FIG. 7, the controller 180 can control the display unit to display the third screen (for example, home screen), which includes at least one third icons A1, A3, A4, A5, A8, A9 and A10 included in the third area 630, in accordance with a specific command. For example, the specific command may be a command to select a specific indicator B displayed on the second screen in (c) of FIG. 7.

The embodiment in (d) of FIG. 7 will be described in comparison with (c) of FIG. 6. In (c) of FIG. 6, the controller 180 can display the third screen, which includes at least one first icon included on the first area of the first screen, in accordance with a first command that selects a specific indicator B displayed on the first screen when the first screen is displayed. Meanwhile, in (d) of FIG. 7, the controller 180 can control the display unit 151 to display the third screen, which includes at least one third icon included on the third area 630 of the second screen, in accordance with a second command that selects a specific indicator B displayed on the second screen when the second screen is displayed.

In addition, in accordance with the embodiment, the controller 180 can control the display unit 151 to display the second screen in accordance with a touch command that touches one point within the second area 620 of the first screen and then upwardly drags the touched point when the first screen is displayed even though the first touch command is not sensed again.

Figure 8:
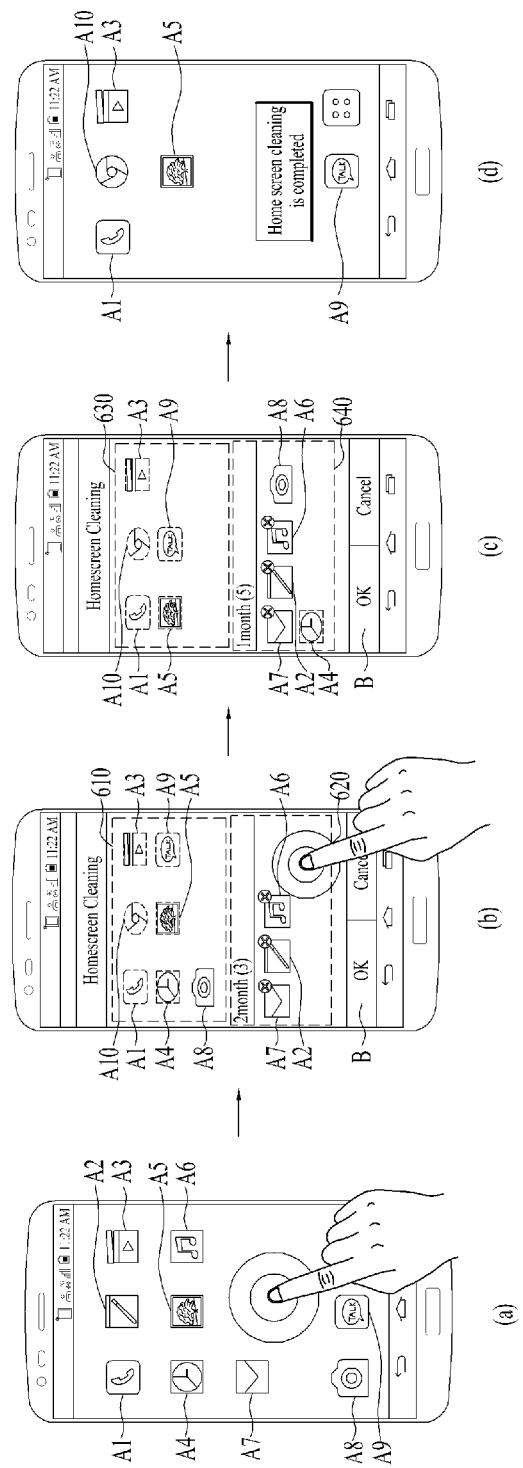
FIG. 8 is a view illustrating still another example of a method for determining an icon which will be displayed on a home screen in a mobile terminal according to one embodiment of the present invention.

Next, FIG. 8 is a view illustrating still another example of a method for determining an icon which will be displayed on a home screen in a mobile terminal according to one embodiment of the present invention. In FIG. 8, repeated description for the description made with reference to FIGS. 6 and 7 will be omitted, and the embodiment of FIG. 8 will be described based on a difference with the embodiments of FIGS. 6 and 7.

Referring to (a) of FIG. 8, the controller 180 can control the display unit 151 to display an icon corresponding to at least one application selected by the user, among the plurality of applications stored in the memory 170, on the home screen. Since this description is the same as the description made with reference to (a) of FIG. 6, its detailed description will be omitted.

The controller 180 can display the first screen in accordance with the first touch input when the predetermined screen (for example, home screen) is displayed. For example, the first touch input may be a touch input of which strength of a pressure applied to the display unit 151 corresponds to the predetermined strength. In accordance with the embodiment, the first touch input may be a touch input of which strength of the pressure applied to the display unit 151 for a predetermined time corresponds to the predetermined strength.

The controller 180 can control the display unit 151 to display at least one first icon corresponding to at least one application, of which frequency of use exceeds a first level based on first information (for example, information on a level of each of the plurality of applications used for a predetermined time) on frequency of use of each of the plurality of applications, on the first area 610 within the first screen when displaying the first screen. Also, the controller 180 can control the display unit 151 to display at least one second icon corresponding to at least one application, of which frequency of use is the first level or less based on the first information on frequency of use among the plurality of applications stored in the memory 170, on the second area 620 within the first screen.

Referring to (b) of FIG. 8, the controller 180 can control the display unit 151 to display at least one first icons A1, A3, A4, A5, A8, A9 and A10 corresponding to at least one application, of which frequency of use exceeds five times for two months, among the plurality of applications, on the first area 610 within the first screen when displaying the first screen. Also, the controller 180 can control the display unit 151 to display at least one second icons A2, A6 and A7 corresponding to at least one application, of which frequency of use is five times or less for two months, among the plurality of applications stored in the memory 170, on the second area 620 within the first screen.

If the first touch input is sensed again when the first screen is displayed, the controller 180 can control the display unit 151 to display a second screen where a position where each of the plurality of icons is displayed is varied within the first screen based on the first information. In more detail, the controller 180 can control the display unit 151 to display at least one third icon corresponding to at least one application, of which frequency of use exceeds a second level based on first information (for example, information on a level of each of the plurality of applications used for a predetermined time) on frequency of use of each of the plurality of applications, on the third area 630 within the second screen when displaying the second screen. Also, the controller 180 can control the display unit 151 to display at least one fourth icon corresponding to at least one application, of which frequency of use is the second level or less based on the first information on frequency of use among the plurality of applications stored in the memory 170, on the fourth area 640 within the second screen.

For example, referring to (c) of FIG. 8, the controller 180 can control the display unit 151 to display at least one third icons A1, A3, A5, A9 and A10 corresponding to at least one application of which frequency of use exceeds five times for one month among the plurality of applications stored in the memory 170, on the third area 630 within the second screen when displaying the first screen. Also, the controller 180 can control the display unit 151 to display at least one fourth icons A2, A4, A6, A7 and A8 corresponding to at least one application of which frequency of use is five times or less for one month among the plurality of applications stored in the memory 170, on the fourth area 640 within the second screen.

As a result, the controller 180 can determine the icons, which will be displayed on the third screen (for example, home screen), in accordance with frequency of use of the applications used as much as predetermined number of times for the predetermined time if the first touch input is sensed once, and may determine the icons, which will be displayed on the third screen, in accordance with frequency of use of the applications used as much as predetermined number of times for a time period reduced to correspond to the sensed touch input if the first touch input is sensed several times.

Meanwhile, referring to (d) of FIG. 8, the controller 180 can control the display unit to display the third screen (for example, home screen), which includes at least one third icons A1, A3, A5, A9 and A10 included in the third area 630, in accordance with a specific command. For example, the specific command may be a command to select a specific indicator B displayed on the second screen in (c) of FIG. 8.

Meanwhile, in accordance with the embodiment, when the icons A1, A3, A5 and A9 corresponding to at least one application, which have been displayed on the home screen before the first touch input is sensed, are displayed on the third screen, the controller 180 can control the display unit 151 to display the corresponding icons A1, A3, A5 and A9 on the position displayed on the home screen. That is, the position of the icons corresponding to the application conventionally existing on the home screen may not be changed.

Figure 9:
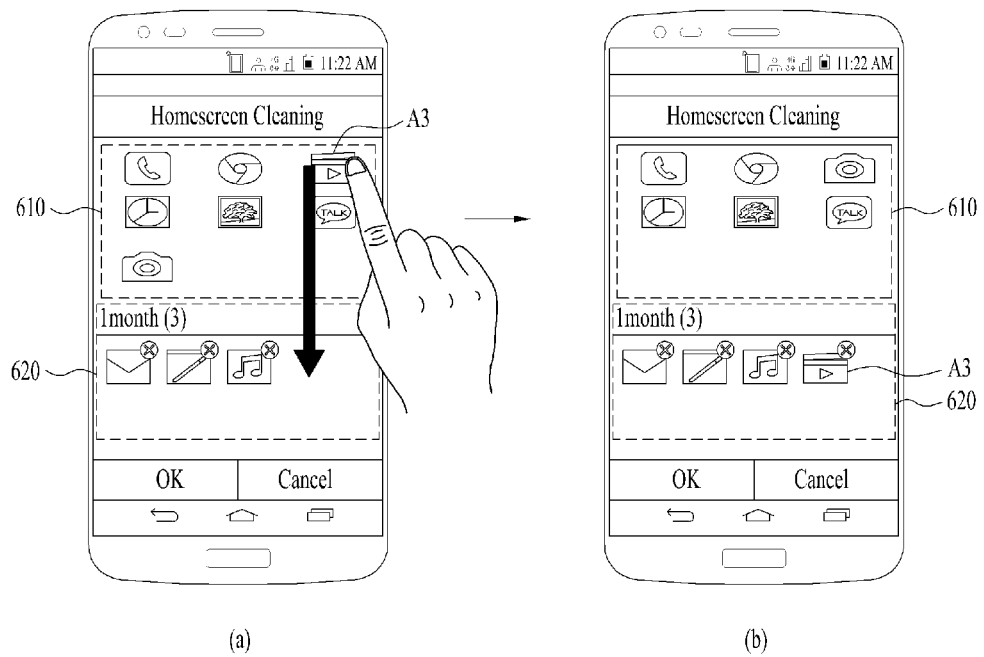
FIG. 9 is a view illustrating an example of a method for not displaying an icon corresponding to an application, of which frequency of use exceeds a predetermined level, on a home screen in a mobile terminal according to one embodiment of the present invention.

Next, FIG. 9 is a view illustrating an example of a method for not displaying an icon corresponding to an application, of which frequency of use exceeds a predetermined level, on a home screen in a mobile terminal according to one embodiment of the present invention. In FIG. 9, repeated description for the description made with reference to FIGS. 6 to 8 will be omitted, and the embodiment of FIG. 9 will be described based on a difference with the embodiments of FIGS. 6 to 8.

First of all, referring to (b) of FIG. 6, the controller 180 can control the display unit 151 to display the first screen in accordance with the touch input of which strength of the pressure applied to the display unit 151 when the home screen is displayed corresponds to the predetermined strength. The first screen may include the first area 610, which displays at least one first icon corresponding to at least one application of which frequency of use exceeds a predetermined level, and the second area 620, which displays at least one second icon corresponding to at least one application of which frequency of use is a predetermined level or less.

Referring to (a) of FIG. 9, in accordance with a command to select a specific one A3 of at least one first icons included in the first area 610, the controller 180 can move the specific icon A3 from the first area 610 to the second area 620. For example, the command to select the specific icon A3 may be a touch command that touches the specific icon A3 for a predetermined time and then drags (or flicks) the touched icon to the second area 620.

Referring to (b) of FIG. 9, the controller 180 can control the display unit 151 to allow the specific icon A3 to disappear from the first area 610 in accordance with the command to select the specific icon A3. Also, the controller 180 can control the display unit 151 to allow the specific icon A3 to appear on the second area 620. As a result, the user can move the specific icon corresponding to the application of which frequency of use exceeds the predetermined level from the first area 610 to the second area 620, whereby the specific icon may not be displayed on the home screen.

Meanwhile, in this embodiment, the method for not displaying the icon corresponding to the application of which frequency of use exceeds the predetermined level on the home screen when the first screen of (b) of FIG. 6 is displayed has been described. However, the icon corresponding to the application of which frequency of use exceeds the predetermined level may not be displayed on the home screen in the same manner even when the second screen of (c) of FIG. 7 is displayed. This is similar to the aforementioned description, and thus its detailed description will be omitted.

Figure 10:
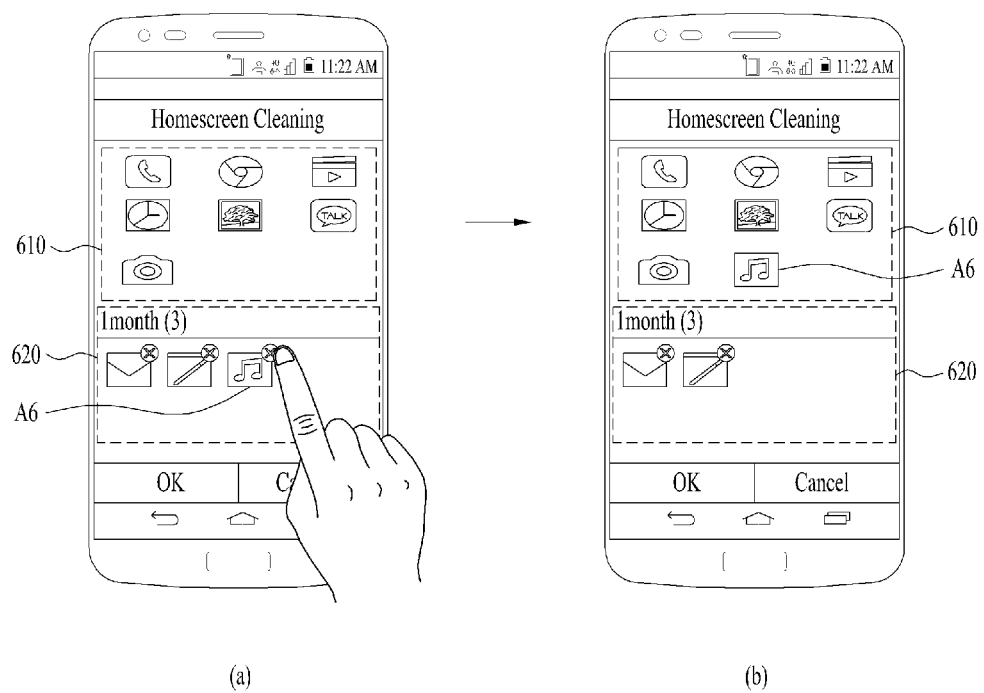
FIG. 10 is a view illustrating an example of a method for displaying an icon corresponding to an application, of which frequency of use is a predetermined level or less, on a home screen in a mobile terminal according to one embodiment of the present invention.

FIG. 10 is a view illustrating an example of a method for displaying an icon corresponding to an application, of which frequency of use is a predetermined level or less, on a home screen in a mobile terminal according to one embodiment of the present invention. In FIG. 10, repeated description for the description made with reference to FIGS. 6 to 8 will be omitted, and the embodiment of FIG. 10 will be described based on a difference with the embodiments of FIGS. 6 to 8.

First of all, referring to (b) of FIG. 6, the controller 180 can control the display unit 151 to display the first screen in accordance with the touch input of which strength of the pressure applied to the display unit 151 when the home screen is displayed corresponds to the predetermined strength. The first screen may include the first area 610, which displays at least one first icon corresponding to at least one application of which frequency of use exceeds a predetermined level, and the second area 620, which displays at least one second icon corresponding to at least one application of which frequency of use is a predetermined level or less.

Referring to (a) of FIG. 10, in accordance with a command to select a specific one A6 of at least one first icons included in the second area 620, the controller 180 can move the specific icon A6 from the second area 620 to the first area 610. For example, the command to select the specific icon A6 may be a command that selects a mark 'x' marked in each of the at least one second icons displayed on the second area 620.

Referring to (b) of FIG. 10, the controller 180 can control the display unit 151 to allow the specific icon A6 to disappear from the second area 620 in accordance with the command to select the specific icon A6. Also, the controller 180 can control the display unit 151 to allow the specific icon A6 to appear on the first area 610. As a result, the user can move the specific icon corresponding to the application of which frequency of use is the predetermined level or less, from the second area 620 to the first area 610, whereby the specific icon may not be displayed on the home screen.

In addition, in this embodiment, the method for displaying the icon corresponding to the application of which frequency of use is the predetermined level or less on the home screen when the first screen of (b) of FIG. 6 is displayed has been described. However, the icon corresponding to the application of which frequency of use is the predetermined level or less may be displayed on the home screen in the same manner even when the second screen of (c) of FIG. 7 is displayed. This is similar to the aforementioned description, and thus its detailed description will be omitted.

Figure 11:
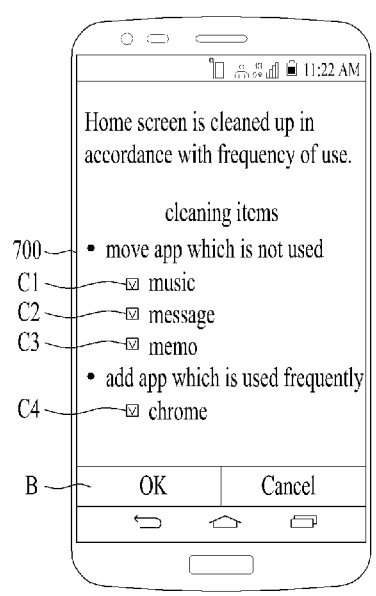
FIG. 11 is a view illustrating further still another example of a method for determining an icon which will be displayed on a home screen in a mobile terminal according to one embodiment of the present invention.

Meanwhile, the first screen displayed in accordance with the first touch input may be provided to a user interface different from that of FIG. 6. This will be described in more detail with reference to FIG. 11. FIG. 11 is a view illustrating further still another example of a method for determining an icon which will be displayed on a home screen in a mobile terminal according to one embodiment of the present invention. In FIG. 11, repeated description for the description made with reference to FIGS. 6 to 8 will be omitted, and the embodiment of FIG. 11 will be described based on a difference with the embodiments of FIGS. 6 to 8.

Referring to FIG. 11, the controller 180 display the first screen 700 in accordance with the first touch input when the home screen is displayed as illustrated in (a) of FIG. 6. In more detail, the first screen 700 may include a first list of applications corresponding to icons, which will be deleted from the home application, among the plurality of applications stored in the memory, and a second list of applications corresponding to icons, which will be added to the home screen. For example, the first list may include applications corresponding to icons, which do not exist on the home screen, among the applications of which frequency of use exceeds the predetermined level. And, the first list may include applications corresponding to icons, which exist on the home screen, among the applications of which frequency of use is the predetermined level or less.

Also, the first screen 700 may include indicators C1, C2, C3 and C4 for identifying whether icons corresponding to at least one application in the first list (or the second list) will be added to (or deleted from) the home screen. The user can select the indicator (for example, third indicator C3) corresponding to a specific application (for example, memo application) among the indicators C1, C2, C3 and C4 included in the first screen 700, whereby the icons of the applications corresponding to the selected indicator C3 may not be deleted from (or added to) the home screen. That is, the user can select the icons, which will be added to (or deleted from) the home screen, by using the indicators C1, C2, C3 and C4 included in the first screen 700.

In accordance with the embodiment, the controller 180 can control the display unit 151 to display the second screen (for example, home screen) in accordance with the specific command (for example, command to select the specific indicator B). The second screen may include the icons corresponding to at least one application selected through the indicator, among at least one applications included in the first list, and may not include the icons corresponding to the at least one application selected through the indicator, among at least one applications included in the second list.

Further, according to one embodiment of the present invention, if the touch input of which strength of the pressure applied to the display unit 151 corresponds to the predetermined strength is maintained for the predetermined time, the controller 180 can control the display unit 151 to display only the icons corresponding to applications, of which frequency of use is high among the plurality of applications stored in the memory 170, on the home screen. This will be described in more detail with reference to FIG. 12.

Figure 12:
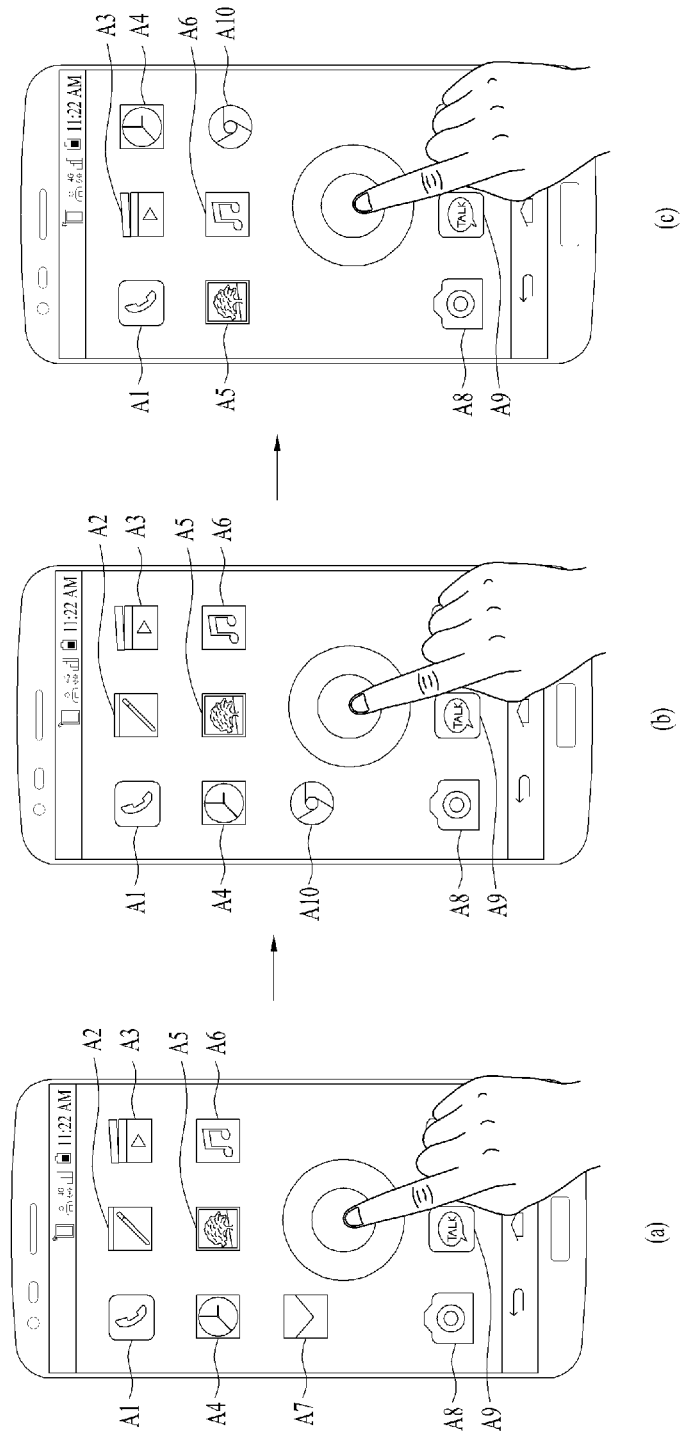
FIG. 12 is a view illustrating an example of a method for displaying an icon corresponding to an application, of which frequency of use is high, on a home screen in a mobile terminal according to one embodiment of the present invention.

FIG. 12 is a view illustrating an example of a method for displaying an icon corresponding to an application, of which frequency of use is high, on a home screen in a mobile terminal according to one embodiment of the present invention. In FIG. 12, repeated description for the description made with reference to FIG. 6 will be omitted, and the embodiment of FIG. 12 will be described based on a difference with the embodiment of FIG. 6.

Referring to (a) of FIG. 12, the sensing unit 140 may sense the first touch input of which strength of the pressure applied to the display unit 151 when the predetermined screen (for example, home screen) is displayed corresponds to the predetermined strength. If the first touch input is maintained for the predetermined time, the controller 180 can control the display unit 151 to display only the icons corresponding to the applications of which frequency of use exceeds the predetermined level among the plurality of applications stored in the memory 170, on the home screen.

In more detail, referring to (b) of FIG. 12, if the first touch input is maintained for a first time (for example, 5 seconds), the controller 180 can control the display unit 151 to display the icons corresponding to the applications of which frequency of use exceeds the first level among the plurality of applications stored in the memory 170, on the home screen. And, referring to (c) of FIG. 12, if the first touch input is maintained for a second time (for example, 10 seconds), the controller 180 can control the display unit 151 to display the icons corresponding to the applications of which frequency of use exceeds the second level among the plurality of applications stored in the memory 170, on the home screen. In this instance, the first time may be shorter than the second time, and may be longer than the second time.

For example, referring to (a) of FIG. 12, it is assumed that first to tenth applications are stored in the memory 170. In this instance, the controller 180 can sense the first touch input when a plurality of icons A1 to A9 corresponding to the first to ninth applications are displayed on the home screen. And, referring to (b) of FIG. 12, if the first touch input is maintained for 5 seconds, the controller 180 can control the display unit 151 to allow only the seventh icon A7 corresponding to the application of which frequency of use is five times or less for two months among the applications displayed on the home screen to disappear from the home screen.

Also, referring to (c) of FIG. 12, if the first touch input is maintained for 10 seconds, the controller 180 can control the display unit 151 to allow the second icon A2 corresponding to the application of which frequency of use is five times or less for one month to additionally disappear from the home screen. That is, if the time when the first touch input is maintained is long, the controller 180 can control the display unit 151 to display only the icons corresponding to the applications used as much as the predetermined number of times or more for the time reduced in proportional to the time when the first touch input is maintained, on the home screen.

In another example, referring to (a) of FIG. 12, it is assumed that first to tenth applications are stored in the memory 170. In this instance, the controller 180 can sense the first touch input when a plurality of icons A1 to A9 corresponding to the first to ninth applications are displayed on the home screen. And, referring to (b) of FIG. 12, if the first touch input is maintained for 5 seconds, the controller 180 can control the display unit 151 to allow the second icon A2 and the seventh icon A7, which correspond to the application of which frequency of use is five times or less for two months to additionally disappear from the home screen.

Also, referring to (c) of FIG. 12, if the first touch input is maintained for 10 seconds, the controller 180 can control the display unit 151 to allow only the seventh icon A7, which corresponds to the application of which frequency of use is five times or less for one month among the applications displayed on the home screen, to disappear from the home screen and allow the second icon A2 to appear on the home screen. That is, if the time when the first touch input is maintained becomes long, the controller 180 can control the display unit 151 to display only the icons corresponding to the applications used as much as the predetermined number of times or more for the time reduced in proportion to the time when the first touch input is maintained, on the home screen.

Meanwhile, according to one embodiment of the present invention, if a background image of the home screen includes a predetermined object, the controller 180 can display the icon corresponding to the application of which frequency of use is high, on an area other than the area where the predetermined object is located when the icon corresponding to the application of which frequency of use is high is output to the home screen.

Figure 13:
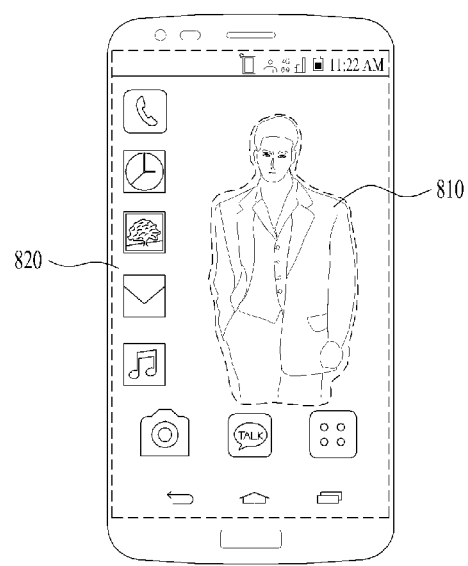
FIG. 13 is a view illustrating an example of a method for outputting an icon corresponding to an application, of which frequency of use is high, on an area other than an area where a predetermined object is located if a background image of a home screen includes the predetermined object in a mobile terminal according to one embodiment of the present invention.

FIG. 13 is a view illustrating an example of a method for outputting an icon corresponding to an application, of which frequency of use is high, on an area other than an area where a predetermined object is located if a background image of a home screen includes the predetermined object in a mobile terminal according to one embodiment of the present invention. In FIG. 13, repeated description for the description made with reference to FIGS. 6 to 12 will be omitted, and the embodiment of FIG. 13 will be described based on a difference with the embodiments of FIGS. 6 to 12.

First of all, referring to FIGS. 6 to 11 and FIG. 12, the controller 180 can control the display unit 151 to display only the first icon corresponding to the application of which frequency of use exceeds the predetermined level among the plurality of applications stored in the memory 170, on the home screen in accordance with a specific command.

The controller 180 can recognize whether the background image of the home screen includes the predetermined object when displaying the first icon corresponding to the application of which frequency of use exceeds the predetermined level, on the home screen. In this instance, the predetermined object may be a character, animal, inanimate object, or the like. For convenience of description in the present invention, it is assumed that the predetermined object is a character.

Referring to FIG. 13, if the background image of the home screen is an object that includes the predetermined object, the controller 180 can sense an area 810 where the predetermined object is located within the home screen when displaying the first icon, which corresponds to the application of which frequency of use exceeds the predetermined level, on the home screen.

The controller 180 can control the display unit 151 to display the at least one first icon on an area 820 other than the sensed area 810 within the home screen. According to this embodiment, it is advantageous in that the controller 180 can automatically arrange the first icon at a position where the object included in the background screen is not covered. Further, according to one embodiment of the present invention, the controller 180 can vary the arrangement of icons displayed on the whole screen depending on the position where a specific touch input is sensed when the home screen is displayed. This will be described in more detail with reference to FIGS. 14 to 17.

Next, FIGS. 14 to 17 are views illustrating examples of a method for varying arrangement of icons displayed on a home screen depending on a position where a specific touch input is sensed when the home screen is displayed in a mobile terminal according to one embodiment of the present invention. For convenience of description in this embodiment, it is assumed that a plurality of applications are stored in the memory 170 and a home screen may virtually be divided into three areas 910, 920 and 930.

The controller 180 can control the display unit 151 to display at least one first icon corresponding to the application of which frequency of use exceeds a predetermined level among the plurality of applications stored in the memory 170, on the home screen in accordance with a touch input for one of the three areas virtually divided within the home screen. In this instance, the touch input may be a touch input of which strength of the pressure applied to the display unit 151 corresponds to the predetermined strength.

The controller 180 can vary arrangement of icons displayed on the home screen depending on the position where the touch input is sensed. For example, referring to (a) of FIG. 14, the controller 180 can sense the touch input for the first area 910 of the three areas 910, 920 and 930 virtually divided when the home screen is displayed. In this instance, it is assumed that a background image of the home screen includes a predetermined object (for example, character). Referring to (b) of FIG. 14, the controller 180 can control the display unit 151 to display the home screen, which includes the at least one first icon, in accordance with the touch input for the first area 910. In this instance, the controller 180 can control the display unit 151 to display the at least one first icon on the home screen without considering the position of the object included in the background image of the home screen. The controller 180 can randomly determine the area where the first icon is displayed on the home screen. Further, in accordance with the embodiment, the controller 180 can control the display unit 151 to display a preview image 1110 of a first screen, which includes the at least one first icon, for the time when the touch input is sensed as illustrated in (a) of FIG. 17.

Figure 15:
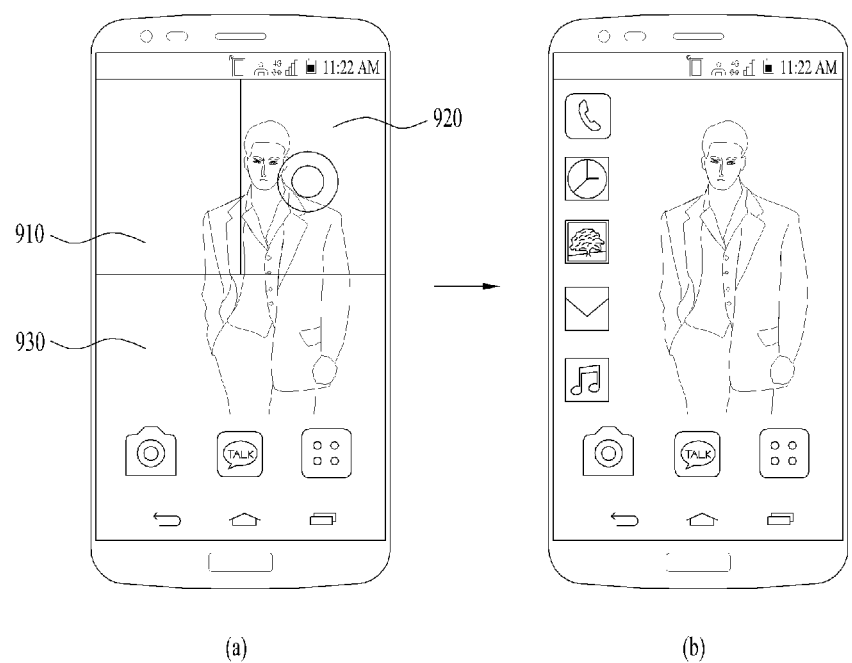

In another example, referring to (a) of FIG. 15, the controller 180 can sense the touch input for the second area 920 of the three areas 910, 920 and 930 virtually divided when the home screen is displayed. In this instance, it is assumed that a background image of the home screen includes a predetermined object (for example, character). Referring to (b) of FIG. 15, the controller 180 can control the display unit 151 to display the home screen, which includes the at least one first icon, in accordance with the touch input for the second area 920. In this instance, the controller 180 can control the display unit 151 to display the at least one first icon on the area where the object included in the background image of the home screen is located, by considering the position of the object included in the background image of the home screen. Meanwhile, in accordance with the embodiment, the controller 180 can control the display unit 151 to display a preview image 1120 of the home screen, which includes the at least one first icon, for the time when the touch input is sensed as illustrated in (b) of FIG. 17.

Figure 16:
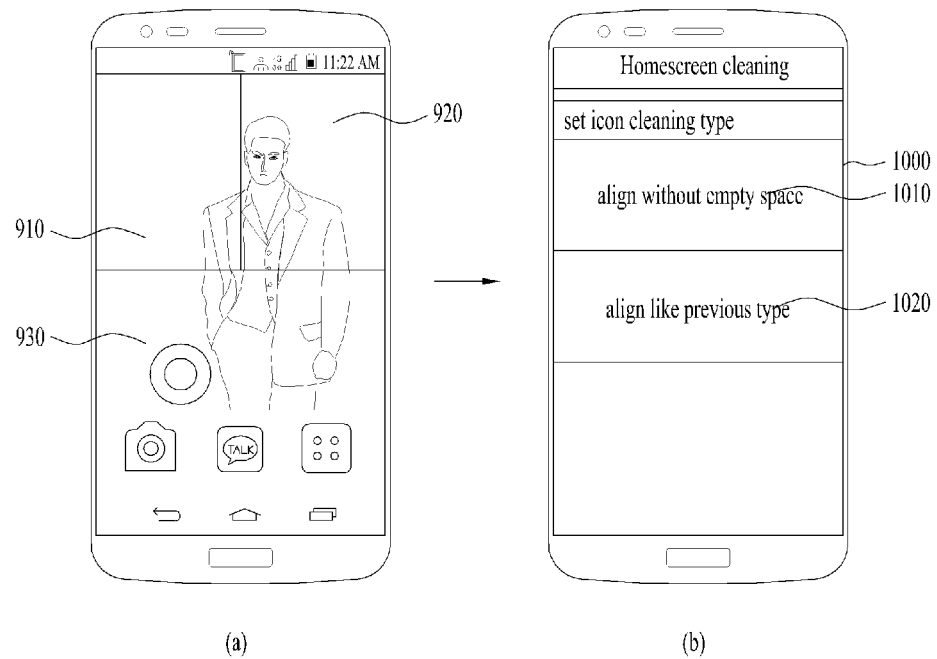
Figure 17:
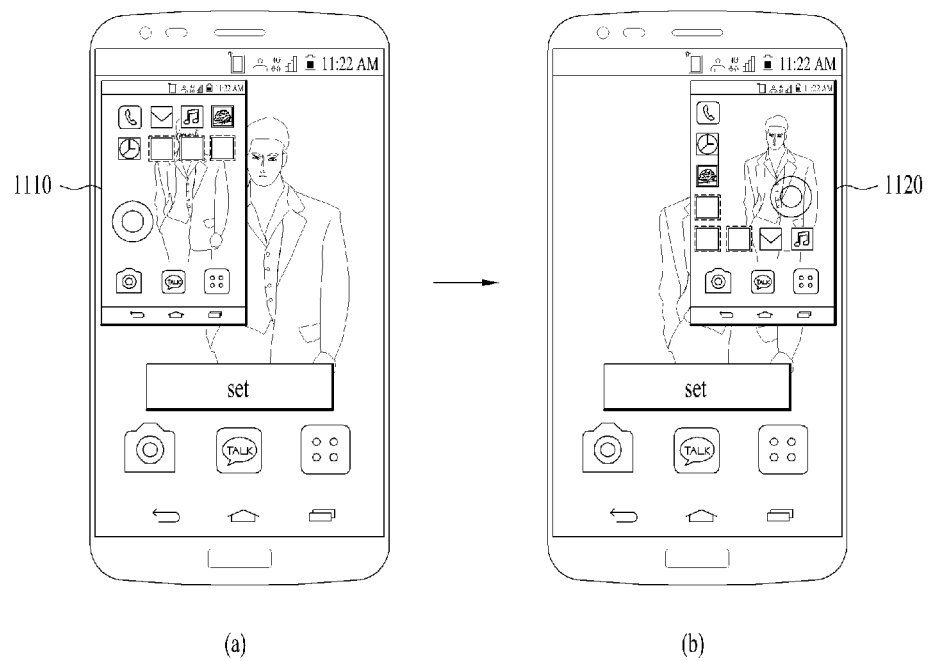

In another example, referring to (a) of FIG. 16, the controller 180 can sense the touch input for the third area 930 of the three areas 910, 920 and 930 virtually divided when the home screen is displayed. In this instance, it is assumed that a background image of the home screen includes a predetermined object (for example, character). Referring to (b) of FIG. 16, the controller 180 can control the display unit 151 to display a screen 1000, which configures how to arrange the at least one first icon, in accordance with the touch input for the third area 930.

Figure 14:
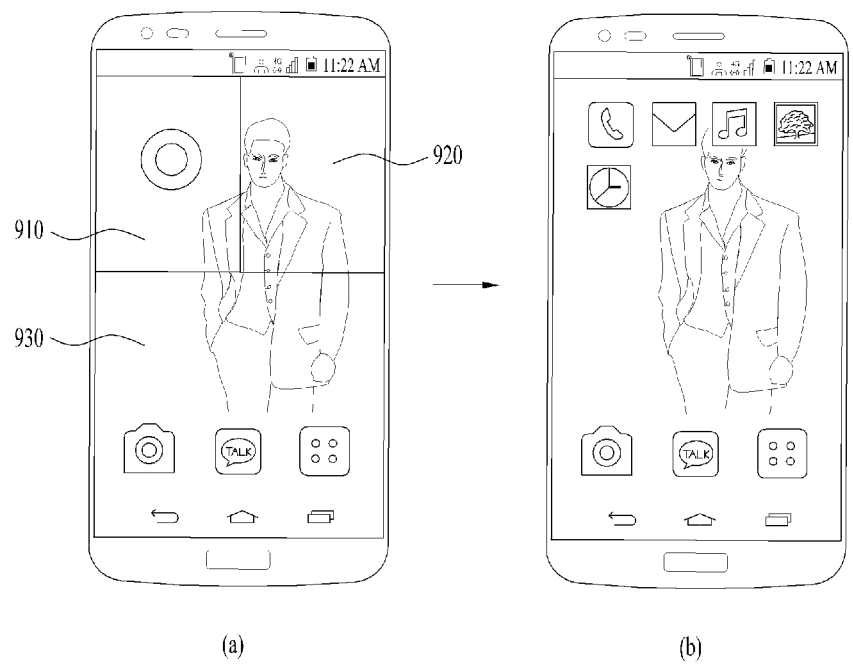
FIGS. 14 to 17 are views illustrating examples of a method for varying arrangement of icons displayed on a home screen depending on a position where a specific touch input is sensed when the home screen is displayed in a mobile terminal according to one embodiment of the present invention.

The controller 180 can control the display unit 151 to display the at least one first icon without considering the position of the object included in the background image of the home screen as illustrated in (b) of FIG. 14 in accordance with a command to select a first indicator 1010 included in the screen 1000. Meanwhile, the controller 180 can control the display unit 151 to display the at least one first icon on an area where the object is not located, by considering the position of the object included in the background image of the home screen as illustrated in (b) of FIG. 15 in accordance with a command to select a second indicator 1020 included in the screen 1000.

In accordance with the embodiment, if the user selects the first indicator 1010 or the second indicator 1020 in (b) of FIG. 16 and then selects the third area 930 within the home screen, the controller 180 can control the display unit 151 to display the at least one first icon on the home screen by using the arrangement method of the icon corresponding to the selected indicator. Further, according to one embodiment of the present invention, the controller 180 can control the display unit 151 to display only an icon corresponding to the application of which frequency of use is high, on the home screen by periodically or non-periodically cleaning up the icons displayed on the home screen. This will be described in more detail with reference to FIG. 18.

Figure 18:
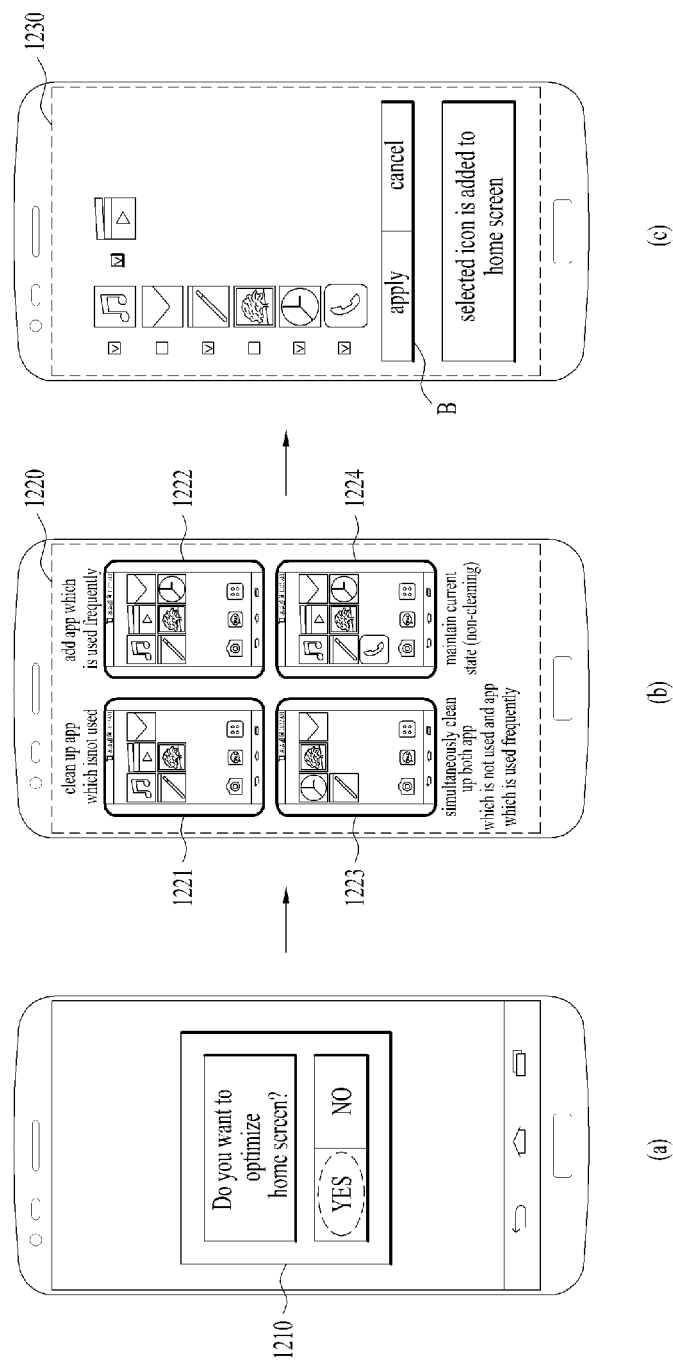
FIG. 18 is a view illustrating an example of a method for periodically or non-periodically cleaning up icons displayed on a home screen in a mobile terminal according to one embodiment of the present invention.

FIG. 18 is a view illustrating an example of a method for periodically or non-periodically cleaning up icons displayed on a home screen in a mobile terminal according to one embodiment of the present invention. In this embodiment, a plurality of applications are stored in the memory 170. The controller 180 can store first information on frequency of use of each of the plurality of applications in the memory 170.

Referring to (a) of FIG. 18, the controller 180 can control the display unit 151 to output a message 1210 for identifying whether icons displayed on a predetermined screen (for example, home screen) are cleaned up periodically (or non-periodically). Referring to (b) of FIG. 18, if a command to clean up the icons displayed on the predetermined screen is sensed through the message 1210, the controller 180 can control the display unit 151 to display a screen 1220 that includes at least one indicators 1221 to 1224 related to a method for cleaning up the icons displayed on the predetermined screen.

In more detail, the screen 1220 may include at least one of the first indicator 1221, the second indicator 1222, the third indicator 1223, and the fourth indicator 1224. The first indicator 1221 may serve to disappear at least one second icon, which corresponds to at least one application (for example, application used five times or less for one month) used at a predetermined level or less, among at least one icons displayed on the predetermined screen, from the predetermined screen.

The second indicator 1222 may serve to appear at least one second icon, which corresponds to at least one application (for example, application used to exceed five times for one month) used to exceed a predetermined level, among at least one icons which are not displayed on the predetermined screen, on the predetermined screen. The third indicator 1223 may serve to appear the at least one second icon on the predetermined screen and disappear the at least one second icon from the predetermined screen. The fourth indicator 1224 may serve to maintain the predetermined screen (for example, home screen) as it is without cleaning up the icons included in the predetermined screen.

Referring to (c) of FIG. 18, the controller 180 can control the display unit 151 to display a screen 1230 for selecting icons, which will be displayed on the home screen, in accordance with a command to select any one of the first indicator 1221, the second indicator 1222 and the third indicator 1223 of (b) of FIG. 18. In more detail, the controller 180 can control the display unit 151 to give a predetermined visual effect to the icons, which will be displayed on the predetermined screen (for example, home screen), and display the corresponding icons on the screen 1230 in accordance with the command to select any one of the first indicator 1221, the second indicator 1222 and the third indicator 1223.

For example, the controller 180 can control the display unit 151 to display a predetermined check mark on the icons which will be displayed on the predetermined screen among the icons displayed on the screen 1230. Therefore, the user can intuitively recognize that the icons having the predetermined check mark within the screen 1230 will be displayed on the home screen and that the icons having no predetermined check mark within the screen 1230 will not be displayed on the home screen.

In accordance with a command to select any one of the icons displayed on the screen 1230, the user can allow the selected icon to be displayed or not to be displayed on the home screen. For example, in accordance with a command to select an icon having no check mark among the icons displayed on the screen 1230, the controller 180 can control the display unit 151 to display a check mark on the selected icon. And, the controller 180 can control the display unit 151 to display the home screen, which includes the icon having the check mark, in accordance with a command to select a specific indicator B included in the screen 1230.

In another example, in accordance with a command to select an icon having a check mark among the icons displayed on the screen 1230, the controller 180 can control the display unit 151 to disappear the check mark from the icon. The controller 180 can control the display unit 151 to disappear the icon having no check mark from the home screen in accordance with a command to select a specific indicator B included in the screen 1230.

In accordance with the embodiment, if any one of the at least one or more indicators is selected in (b) of FIG. 18, the controller may perform a function corresponding to the selected indicator without displaying the screen 1230 for selecting icons, which will be displayed on the predetermined screen, as illustrated in (c) of FIG. 18. According to this embodiment, it is advantageous in that the icons which will be displayed on the home screen may be cleaned up periodically (or non-periodically).

In addition, according to one embodiment of the present invention, the controller 180 can control the display unit 150 to display another screen different from the home screen in accordance with a touch command to touch one point within the home screen and drag the touched point in a specific direction when the home screen is displayed. This will be described in more detail with reference to FIG. 19.

Figure 19:
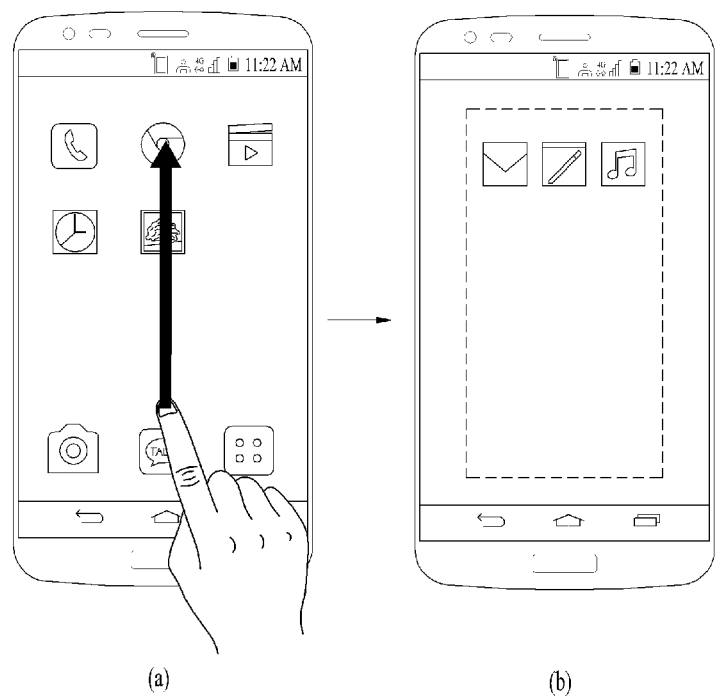
FIG. 19 is a view illustrating an example of a method for displaying a fourth screen in accordance with a specific touch input when a home screen is displayed in a mobile terminal according to one embodiment of the present invention.

Next, FIG. 19 is a view illustrating an example of a method for displaying a fourth screen in accordance with a specific touch input when a home screen is displayed in a mobile terminal according to one embodiment of the present invention. In FIG. 19, repeated description for the description made with reference to FIG. 6 will be omitted, and the embodiment of FIG. 19 will be described based on a difference with the embodiment of FIG. 6.

Referring to (a) of FIG. 19, the controller 180 can control the display unit 151 to display a fourth screen of (b) of FIG. 19 in accordance with a second touch input when the home screen is displayed. For example, the second touch input may be a touch input that touches one point within the home screen when the home screen is displayed and then drags the touched point. In this instance, the home screen may include at least one first icon (at least one icon corresponding to an application of which frequency of use exceeds a first level) displayed on the first area 610 in (b) of FIG. 6, and may include at least one third icon (at least one icon corresponding to an application of which frequency of use exceeds a second level) displayed on the third area 630 in (c) of FIG. 7 or (c) of FIG. 8.

Meanwhile, referring to (b) of FIG. 19, the fourth screen may include at least one second icon (at least one icon corresponding to an application of which frequency of use is a predetermined level or less) displayed on the second area 620 in (b) of FIG. 6, and may include at least one fourth icon (at least one icon corresponding to an application of which frequency of use is a second level or less) displayed on the fourth area 640 in (c) of FIG. 7 or (c) of FIG. 8. In this instance, the background image of the fourth screen may be the same as that of the predetermined screen (for example, home screen), or may be different from that of the predetermined screen.

As a result, the controller 180 can display the first icon corresponding to at least one application of which frequency of use is high, on the home screen. In addition, the controller 180 can display the second icon corresponding to at least one application of which frequency of use is low, on the fourth screen (screen displayed in accordance with a touch input that touches one point within the home screen and then drags the touched point in an upward direction).

In addition, according to one embodiment of the present invention, the user can stop displaying a specific one of the icons displayed on the home screen (or the fourth screen) from the home screen (or the fourth screen) in accordance with a specific touch input, and may allow the specific icon to be displayed on only a screen which is displayed by an input of a password. This will be described in more detail with reference to FIGS. 20 and 21.

Figure 20:
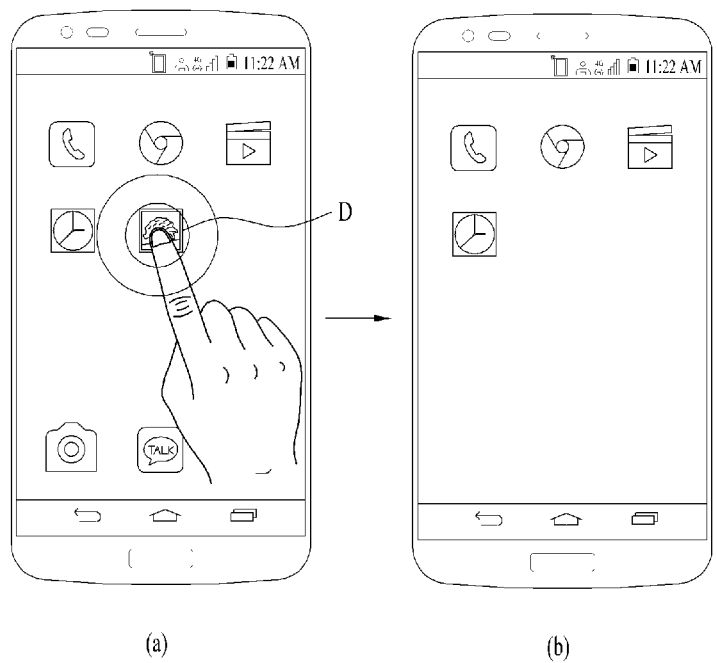
FIGS. 20 and 21 are views illustrating examples of a method for enabling a specific one of icons displayed on a screen to disappear from the screen in a mobile terminal according to one embodiment of the present invention.
Figure 21:
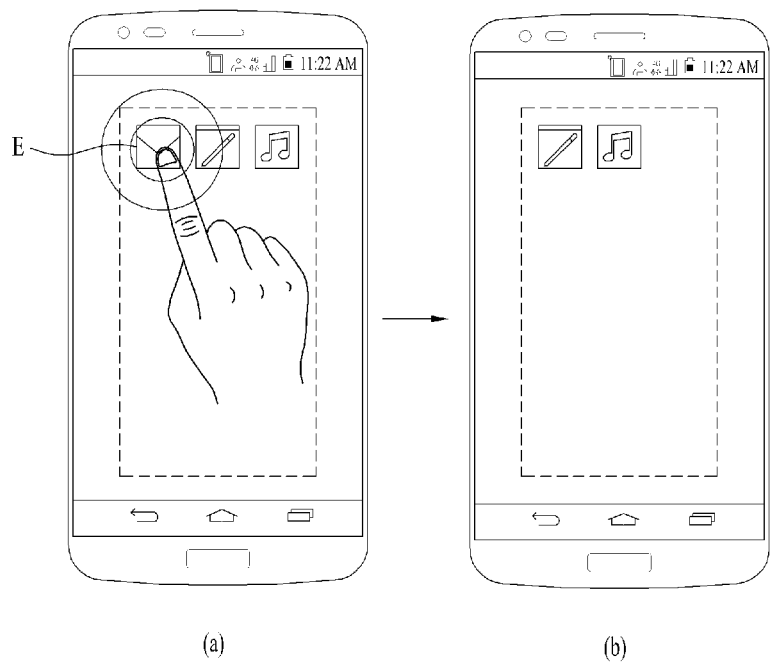

Next, FIGS. 20 and 21 are views illustrating examples of a method for enabling a specific one of icons displayed on a screen to disappear from the screen in a mobile terminal according to one embodiment of the present invention. Referring to FIG. 20, in accordance with a specific touch input for an icon corresponding to a specific one of at least one or more applications included in a home screen when the home screen is displayed, the controller 180 can control the display unit 151 to allow the icon corresponding to the specific application to disappear from the home screen.

In more detail, referring to (a) of FIG. 20, the controller 180 can sense a touch input that selects an area where a specific one D of at least one or more icons included in the home screen is displayed as a predetermined pressure strength when the home screen is displayed. Referring to (b) of FIG. 20, the controller 180 can control the display unit 151 to stop displaying the specific icon D from the home screen in accordance with the touch input in (a) of FIG. 20. According to this embodiment, it is advantageous in that the user can allow an icon, which is desired not to be displayed on the home screen, to easily disappear from the home screen.

Further, referring to FIG. 21, in accordance with a specific touch input for an icon corresponding to a specific one of at least one or more applications included in a fourth screen when the fourth screen is displayed, the controller 180 can control the display unit 151 to stop displaying the icon corresponding to the specific application from the fourth screen. In this instance, the fourth screen may be displayed in accordance with a touch input that touches a random point within the home screen when the home screen is displayed and then drags the touched point in an upward direction.

In more detail, referring to (a) of FIG. 21, the controller 180 can sense a touch input that selects an area where a specific one E of at least one or more applications included in the fourth screen when the fourth screen is displayed, as strength of a predetermined pressure. And, referring to (b) of FIG. 21, the controller 180 can control the display unit 151 to allow the specific icon E to disappear from the home screen in accordance with the touch input in (a) of FIG. 21.

Also, according to one embodiment of the present invention, the icon corresponding to the specific application, which disappears from the home screen or the fourth screen in FIGS. 20 and 21, may be displayed on the corresponding screen only if a password is input. This will be described in more detail with reference to FIG. 22.

Figure 22:
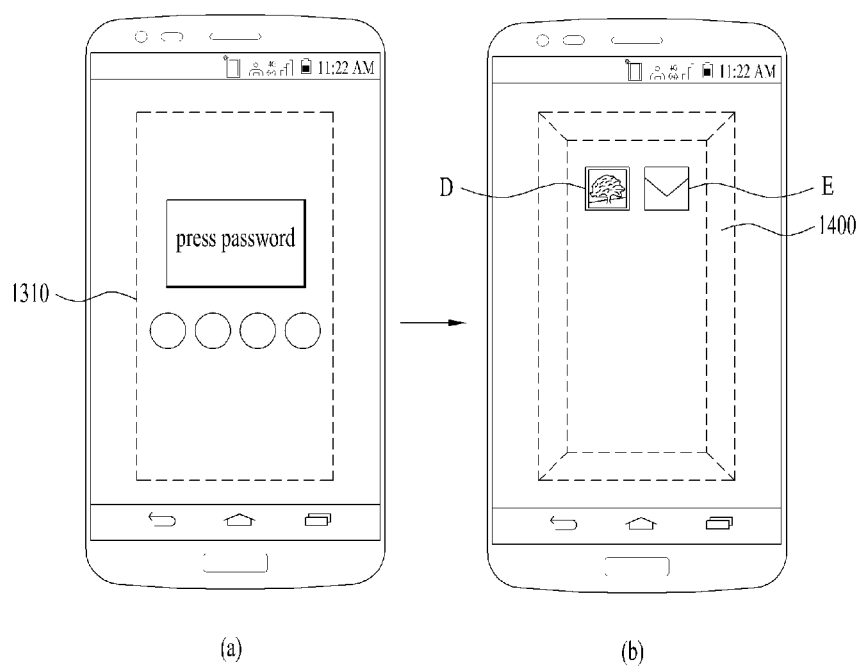
FIG. 22 is a view illustrating an example of a screen displayed if a password is released in a mobile terminal according to one embodiment of the present invention.

FIG. 22 is a view illustrating an example of a screen displayed if a password is released in a mobile terminal according to one embodiment of the present invention. In FIG. 22, repeated description for the description made with reference to FIGS. 20 and 21 will be omitted, and the embodiment of FIG. 22 will be described based on differences with the embodiment of FIGS. 20 and 21.

Referring to (a) of FIG. 22, the controller 180 can control the display unit 151 to display a fifth screen 1310 for inputting a password in accordance with a fourth touch input or a fifth touch input. For example, the fourth touch input may be a touch input that displays a fourth screen in accordance with a touch input, which touches one point within the home screen when the home screen is displayed and then drags the touched point in an upward direction, and touches one point within the fourth screen when the fourth screen is displayed and then drags the touched point in an upward direction. In another example, the fifth touch input may be a touch input that touches one point within the fourth screen when the fourth screen is displayed and then drags the touched point in an upward direction.

Referring to (b) of FIG. 22, if the password is released through a fifth screen 1310, the controller 180 can control the display unit 151 to display a sixth screen 1400, which includes the icon D that disappears in (b) of FIG. 20 and corresponds to the specific application and the icon E that disappears in (b) of FIG. 21 and corresponds to the specific application. For example, in order that the password is released through the fifth screen 1310, any one of a predetermined PIN (Personal Identification Number) input, a predetermined pattern input, predetermined fingerprint recognition, predetermined voice recognition, and predetermined face recognition may be required.

According to the related art, a password was not set to a screen that includes a plurality of icons. However, according to this embodiment, as a password is set to a screen that includes a plurality of icons, the password is required to be released for execution of an application corresponding to each of the plurality of icons included in the screen, whereby it is advantageous in that security for the plurality of applications is enhanced.

In addition, according to one embodiment of the present invention, a predetermined visual effect may be provided to an application, which is used frequently in a place, where a mobile terminal is currently located, at a current time, among at least one or more applications included in the home screen. This will be described in more detail with reference to FIG. 23.

Figure 23:
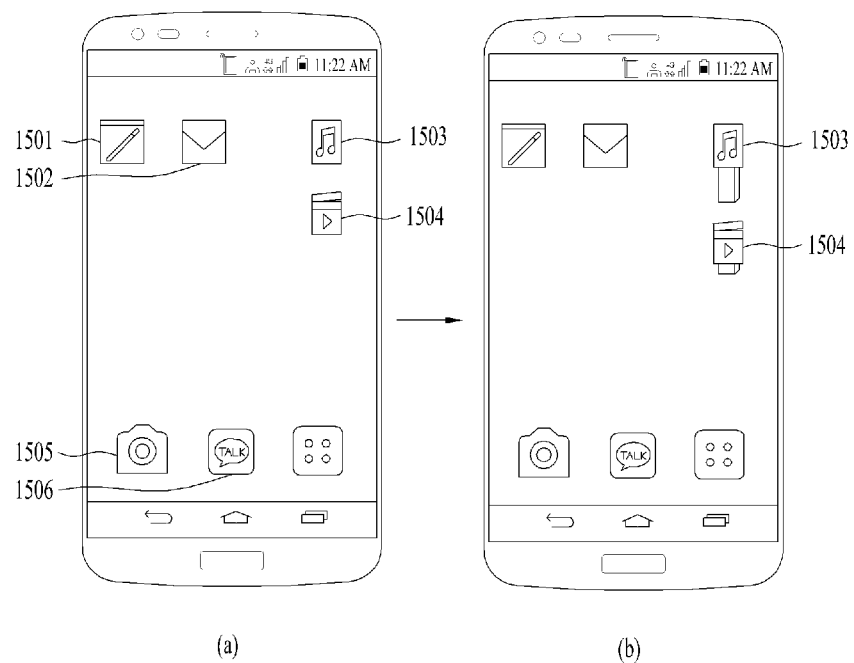
FIG. 23 is a view illustrating an example of a method for providing a predetermined visual effect to an application, which is used frequently in a place where a mobile terminal is currently located at a current time, among at least one or more applications included in a home screen in the mobile terminal according to one embodiment of the present invention.

In particular, FIG. 23 is a view illustrating an example of a method for providing a predetermined visual effect to an application, which is used frequently in a place, where a mobile terminal is currently located, at a current time, among at least one or more applications included in a home screen in the mobile terminal according to one embodiment of the present invention. Referring to (a) of FIG. 23, the controller 180 can control the display unit 151 to display at least one icon corresponding to at least one or more applications selected by the user among a plurality of applications stored in the memory 170, on the home screen. For example, the controller 180 can control the display unit 151 to display first to sixth icons 1501 to 1506, which correspond to the plurality of applications selected by the user, on the home screen.

The controller 180 can control the sensing unit 140 to recognize first information on the time when each of the plurality of applications corresponding to a plurality of icons displayed on the home screen is used. The controller 180 can control the wireless communication unit 110 to recognize second information on a place where the mobile terminal is located when each of the plurality of applications corresponding to the plurality of icons displayed on the home screen is used. In more detail, the controller 180 can control the position information module 115 to recognize the second information on the place where the mobile terminal is located when each of the plurality of applications corresponding to the plurality of icons displayed on the home screen is used.

Further, the controller 180 can control the sensing unit 140 to recognize third information on a current time when the home screen is displayed, and may control the wireless communication unit 110, specifically the position information module 115 to recognize fourth information on a place where the mobile terminal is located when the home screen is displayed.

Referring to (b) of FIG. 23, the controller 180 can allow the first information and the second information to provide a predetermined visual effect to icons 1503 and 1504 of at least one application corresponding to the third information and the fourth information, among the plurality of icons displayed on the home screen. For example, if the application corresponding to the third icon 1503 is used in Seoul station 20 times at 3:00 p.m., the controller 180 can provide a predetermined visual effect to the third icon 1503 if the current time corresponds to 3:00 p.m. and it is sensed that the current position of the mobile terminal corresponds to Seoul station. In this instance, the predetermined visual effect may indicate that the third icon is displayed to be brighter than any other icon or a stick is displayed below the third icon.

Also, if the application corresponding to the fourth icon 1504 is used in Seoul station 10 times at 3:00 p.m., the controller 180 can provide a predetermined visual effect to the third icon 1503 if the current time corresponds to 3:00 p.m. and it is sensed that the current position of the mobile terminal corresponds to Seoul station. In this instance, since the fourth icon 1504 is used less frequently than the third icon 1503, the visual effect provided to the fourth icon 1504 may be less than that provided to the third icon 1503. For example, if a long stick is displayed below the third icon 1503, a short stick may be displayed below the fourth icon 1504.

That is, the controller 180 can control the display unit 151 to provide the predetermined visual effect to the icon, which corresponds to the application which is used frequently in a place corresponding to the place where the mobile terminal is currently located at a time corresponding to the current time, among the icons displayed on the home screen. According to this embodiment, it is advantageous in that the predetermined visual effect is provided to the application, which is likely to be used by the user, by using a tendency of the user who uses the same application frequently under the same condition, so as to allow the user to easily find an icon for execution of the corresponding application.

Figure 24:
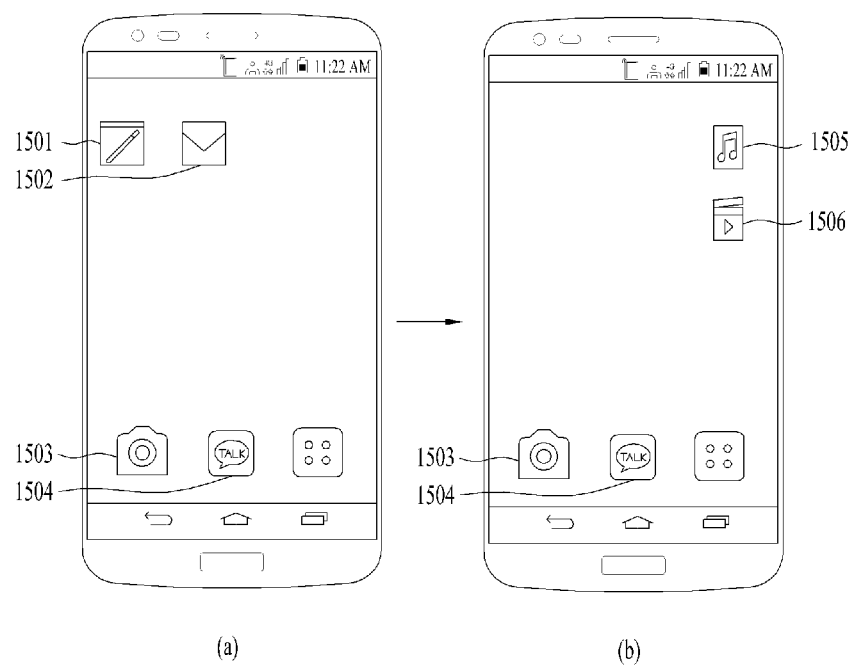
FIG. 24 is a view illustrating an example of a method for varying an icon displayed on a home screen depending on a current time and a place where a mobile terminal is currently located, in the mobile terminal according to one embodiment of the present invention.

Meanwhile, according to one embodiment of the present invention, the icons displayed on the home screen may be changed depending on the current time and the place where the mobile terminal is currently located. This will be described in more detail with reference to FIG. 24. In particular, FIG. 24 is a view illustrating an example of a method for varying an icon displayed on a home screen depending on a current time and a place where a mobile terminal is currently located, in the mobile terminal according to one embodiment of the present invention. The controller 180 can control the sensing unit 140 to recognize first information on the time when each of the plurality of applications stored in the memory 170 is used.

The controller 180 can control the wireless communication unit 110 to recognize second information on the place where the mobile terminal 100 is located when each of the plurality of applications stored in the memory 170 is used. In more detail, the controller 180 can control the position information module 115 to recognize the second information on the place where the mobile terminal 100 is located when each of the plurality of applications stored in the memory 170 is used. In addition, the controller 180 can control the sensing unit 140 to recognize third information on a current time when the home screen is displayed, and may control the position information module 115 to recognize fourth information on the place where the mobile terminal 100 is located when the home screen is displayed.

The controller 180 can control the display unit 151 to allow the first information and the second information to display at least one application corresponding to the third information and the fourth information on the home screen when the home screen is displayed. For example, referring to (a) of FIG. 24, if the user uses the first to fourth applications in Seoul station 10 times or more at the time corresponding to 1:00 a.m., the current time corresponds to 1:00 a.m. and the current position of the mobile terminal is Seoul station, the controller 180 can control the display unit 151 to display only the plurality of icons 1501 to 1504 corresponding to the first to fourth applications on the home screen.

Also, referring to (b) of FIG. 24, if the user uses the third to sixth applications in Seoul station 10 times or more at the time corresponding to 2:00 p.m., the current time corresponds to 2:00 p.m. and the current position of the mobile terminal is Seoul station, the controller 180 can control the display unit 151 to display only the icons 1503 to 1506 corresponding to the third to sixth applications on the home screen.

That is, the controller 180 can control the display unit 151 to display the icons, which correspond to the applications which are used frequently in a place corresponding to the place where the mobile terminal is currently located at a time corresponding to the current time, on the home screen. According to this embodiment, it is advantageous in that the icons displayed on the home screen may be varied in accordance with a tendency of the user who uses the same application frequently under the same condition, so as to provide the user with convenience.

According to at least one of the aforementioned embodiments of the present invention, the user can easily clean up the icons corresponding to the applications which are not used frequently, among the icons displayed on the home screen. Also, if the icons corresponding to the applications which are used frequently by the user are not displayed on the home screen, the user can easily add the corresponding icons to the home screen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a wireless communication unit configured to provide wireless communication;
a touchscreen; and
a controller configured to:
display a home screen on the touchscreen including a plurality of application icons corresponding to applications executable on the mobile terminal,
receive a first touch input on the home screen,
in response to the first touch input on the home screen, replace the home screen with a first screen on the touchscreen including a rearrangement of the application icons in which the application icons having a first frequency of use are displayed in a first area of the first screen and concurrently the application icons having a second frequency of use are displayed in a second area of the first screen, the first frequency of use corresponds to the application icons being used greater than a predetermined number of times in a first time period and the second frequency of use corresponds to the application icons being used equal to or less than the predetermined number of times in the first time period,
receive a second touch input on the first screen, and
in response to the second touch input on the first screen, replace the first screen with a second screen on the touchscreen including a rearrangement of the application icons in which the application icons having a third frequency of use are displayed in a first area of the second screen and concurrently the application icons having a fourth frequency of use are displayed in a second area of the second screen, the third frequency of use corresponds to the application icons being used greater than the predetermined number of times in a second time period shorter than the first time period and the fourth frequency of use corresponds to the application icons being used less than the predetermined number of times in the second time period.

2. The mobile terminal according to claim 1, further comprising:
a sensing unit configured to sense a strength of a pressure applied to the touchscreen,
wherein the first touch input is a touch input of which strength of the pressure applied to the touchscreen corresponds to a predetermined strength.

3. The mobile terminal according to claim 1, wherein the controller is further configured to:
set the home screen to include the application icons having the first frequency of use in response to a predetermined command for setting the home screen when the first screen is displayed, and
set the home screen to include the application icons having the third frequency of use in response to the predetermined command for setting the home screen when the second screen is displayed.

4. The mobile terminal according to claim 3, wherein the controller is further configured to display the application icons of the set home screen on an area other than an area where a background image is included in the home screen.

5. The mobile terminal according to claim 3, wherein the controller is further configured to:
receive a touch and drag input on the set home screen,
display the application icons having the second frequency of use in response to the received touch and drag input on the home screen having the application icons with the first frequency of use, and
display the application icons having the fourth frequency of use in response to the received touch and drag input on the home screen having the application icons with the third frequency of use.

6. The mobile terminal according to claim 3, wherein the controller is further configured to:
receive a touch input at a predetermined pressure strength on a particular application icon on the set home screen, and
stop displaying the particular application icon on the set home screen.

7. The mobile terminal according to claim 6, wherein the controller is further configured to:
display a password screen for inputting a password, and
display a screen including the particular application icon that was stopped being displayed, in response the password successfully being input in the password screen.

8. The mobile terminal according to claim 1, wherein the controller is further configured to display a visual effect to a corresponding application icon included in the displayed home screen when the mobile terminal is located within a predetermined area and at a specific time, and
wherein the corresponding application icon is used more than a preset number of times within the predetermined area and at the specific time.

9. The mobile terminal according to claim 1, wherein the controller is further configured to display only specific application icons when the mobile terminal is located within a predetermined area and at a specific time, and wherein the specific application icons are used more than a preset number of times within the predetermined area and at the specific time.

10. A method of controlling a mobile terminal, the method comprising:

displaying, via a touchscreen, a home screen including a plurality of application icons corresponding to applications executable on the mobile terminal;

receiving, via a controller, a first touch input on the home screen;

in response to the first touch input on the home screen, replacing, via the touchscreen, the home screen with a first screen including a rearrangement of the application icons in which the application icons having a first frequency of use are displayed in a first area of the first screen and concurrently the application icons having a second frequency of use are displayed in a second area of the first screen, the first frequency of use corresponds to the application icons being used greater than a predetermined number of times in a first time period and the second frequency of use corresponds to the application icons being used equal to or less than the predetermined number of times in the first time period;

receiving, via the controller, a second touch input on the first screen; and in response to the second touch input on the first screen, replacing, via the touchscreen, the first screen with a second screen including a rearrangement of the application icons in which the application icons having a third frequency of use are displayed in a first area of the second screen and concurrently the application icons having a fourth frequency of use are displayed in a second area of the second screen, the third frequency of use corresponds to the application icons being used greater than the predetermined number of times in a second time period shorter than the first time period and the fourth frequency of use corresponds to the application icons being used less than the predetermined number of times in the second time period.

11. The method according to claim 10, further comprising:

sensing, via a sensing unit, a strength of a pressure applied to the touchscreen, wherein the first touch input is a touch input of which strength of the pressure applied to the touchscreen corresponds to a predetermined strength.

12. The method according to claim 10, further comprising:

setting, via the controller, the home screen to include the application icons having the first frequency of use in response to a predetermined command for setting the home screen when the first screen is displayed; and setting, via the controller, the home screen to include the application icons having the third frequency of use in response to the predetermined command for setting the home screen when the second screen is displayed.

13. The method according to claim 12, further comprising:

displaying the application icons of the set home screen on an area other than an area where a background image is included in the home screen.

14. The method according to claim 12, further comprising:

receiving a touch and drag input on the set home screen;

displaying the application icons having the second frequency of use in response to the received touch and drag input on the home screen having the application icons with the first frequency of use; and displaying the application icons having the fourth frequency of use in response to the received touch and drag input on the home screen having the application icons with the third frequency of use.

15. The method according to claim 12, further comprising:

receiving, via the controller, a touch input at a predetermined pressure strength on a particular application icon on the set home screen; and stop displaying the particular application icon on the set home screen.

16. The method according to claim 15, further comprising:

displaying a password screen for inputting a password; and displaying a screen including the particular application icon that was stopped being displayed, in response the password successfully being input in the password screen.

17. The method according to claim 10, further comprising:

displaying a visual effect to a corresponding application icon included in the displayed home screen when the mobile terminal is located within a predetermined area and at a specific time, wherein the corresponding application icon is used more than a preset number of times within the predetermined area and at the specific time.

18. The method according to claim 10, further comprising:

displaying only specific application icons when the mobile terminal is located within a predetermined area and at a specific time, wherein the specific application icons are used more than a preset number of times within the predetermined area and at the specific time.

* * * * *